(12) United States Patent
Hazel et al.

(10) Patent No.: US 11,795,548 B2
(45) Date of Patent: *Oct. 24, 2023

(54) THERMAL BARRIER COATING

(71) Applicant: Raytheon Technologies Corporation, Farmington, CT (US)

(72) Inventors: Brian T. Hazel, Avon, CT (US); Xuan Liu, Glastonbury, CT (US); Kaylan M. Wessels, West Hartford, CT (US); Elisa M. Zaleski, Vernon, CT (US); Kimberly Marilurene Adams, Manchester, CT (US); Richard W. Jackson, Mystic, CT (US)

(73) Assignee: RTX Corporation, Farmington, CT (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/241,469

(22) Filed: Apr. 27, 2021

(65) Prior Publication Data

US 2021/0332482 A1 Oct. 28, 2021

Related U.S. Application Data

(60) Provisional application No. 63/016,203, filed on Apr. 27, 2020.

(51) Int. Cl.
*C22C 19/03* (2006.01)
*C23C 4/134* (2016.01)
(Continued)

(52) U.S. Cl.
CPC .......... *C23C 28/3455* (2013.01); *B32B 15/04* (2013.01); *B32B 15/043* (2013.01);
(Continued)

(58) Field of Classification Search
CPC .... C23C 4/02; C23C 4/06; C23C 4/10; C23C 4/11; C23C 4/134; C23C 4/04;
(Continued)

(56) References Cited

U.S. PATENT DOCUMENTS

| 10,508,809 B2 | 12/2019 | Hoel et al. |
| 2015/0159507 A1 | 6/2015 | Sivaramakrishnan et al. |

(Continued)

FOREIGN PATENT DOCUMENTS

| EP | 3453779 A1 | 3/2019 |
| WO | 2016/105327 A1 | 6/2016 |
| WO | 2017/080948 A1 | 5/2017 |

OTHER PUBLICATIONS

"Grit to Mesh Conversion", first page of Jan. 11, 2022 ISA/US google search for "what mesh is 80 grit", excerpting "Microns to Grit Size Chart" https://www.raptorblaster.com/sandblasting-grit-conversion-chart/ Jul. 15, 2019, Raptor Blasting Systems llc, Sacramento, CA.

(Continued)

*Primary Examiner* — Michael E. La Villa
(74) *Attorney, Agent, or Firm* — Bachman & LaPointe, P.C.

(57) ABSTRACT

A coated substrate has a substrate and a coating system having one or more ceramic layers. At least a first layer of one of the one or more ceramic layers is a columnar layer having as-deposited columns and intercolumn gaps. The intercolumn gaps have a mean width at least one of: at least 4.0 micrometers; and at least 1.5% of a thickness of said first layer.

20 Claims, 19 Drawing Sheets

(51) Int. Cl.

| | |
|---|---|
| *C23C 4/11* | (2016.01) |
| *C04B 35/50* | (2006.01) |
| *F01D 5/28* | (2006.01) |
| *C23C 28/00* | (2006.01) |
| *C23C 28/04* | (2006.01) |
| *C23C 4/06* | (2016.01) |
| *C23C 4/02* | (2006.01) |
| *C04B 35/486* | (2006.01) |
| *C23C 4/10* | (2016.01) |
| *F01D 25/00* | (2006.01) |
| *C23C 30/00* | (2006.01) |
| *C23C 4/04* | (2006.01) |
| *C22C 19/05* | (2006.01) |
| *B32B 18/00* | (2006.01) |
| *B32B 15/04* | (2006.01) |
| *B32B 15/18* | (2006.01) |

(52) U.S. Cl.
CPC .............. *B32B 15/18* (2013.01); *B32B 18/00* (2013.01); *C04B 35/486* (2013.01); *C04B 35/50* (2013.01); *C22C 19/03* (2013.01); *C22C 19/05* (2013.01); *C23C 4/02* (2013.01); *C23C 4/04* (2013.01); *C23C 4/06* (2013.01); *C23C 4/10* (2013.01); *C23C 4/11* (2016.01); *C23C 4/134* (2016.01); *C23C 28/04* (2013.01); *C23C 28/042* (2013.01); *C23C 28/044* (2013.01); *C23C 28/30* (2013.01); *C23C 28/32* (2013.01); *C23C 28/321* (2013.01); *C23C 28/3215* (2013.01); *C23C 28/34* (2013.01); *C23C 28/345* (2013.01); *C23C 28/347* (2013.01); *C23C 28/36* (2013.01); *C23C 30/00* (2013.01); *C23C 30/005* (2013.01); *F01D 5/28* (2013.01); *F01D 5/284* (2013.01); *F01D 5/288* (2013.01); *F01D 25/005* (2013.01); *C04B 2235/3224* (2013.01); *C04B 2235/3225* (2013.01); *C04B 2235/3246* (2013.01); *F05D 2230/312* (2013.01); *F05D 2230/90* (2013.01); *F05D 2260/95* (2013.01); *F05D 2300/15* (2013.01); *F05D 2300/20* (2013.01); *F05D 2300/21* (2013.01); *F05D 2300/608* (2013.01); *Y10T 428/12389* (2015.01); *Y10T 428/12396* (2015.01); *Y10T 428/12451* (2015.01); *Y10T 428/12458* (2015.01); *Y10T 428/12479* (2015.01); *Y10T 428/12486* (2015.01); *Y10T 428/12597* (2015.01); *Y10T 428/12604* (2015.01); *Y10T 428/12611* (2015.01); *Y10T 428/12618* (2015.01); *Y10T 428/12931* (2015.01); *Y10T 428/12937* (2015.01); *Y10T 428/12944* (2015.01); *Y10T 428/12951* (2015.01); *Y10T 428/12979* (2015.01); *Y10T 428/12993* (2015.01); *Y10T 428/2495* (2015.01); *Y10T 428/24967* (2015.01); *Y10T 428/24992* (2015.01); *Y10T 428/263* (2015.01); *Y10T 428/264* (2015.01); *Y10T 428/265* (2015.01)

(58) Field of Classification Search
CPC .............. C23C 28/3455; C23C 28/042; C23C 28/3215; C23C 28/36; C23C 28/04; C23C 28/044; C23C 28/30; C23C 28/32; C23C 28/321; C23C 28/34; C23C 28/345; C23C 28/347; C23C 30/00; C23C 30/005; C04B 35/486; C04B 35/50; C04B 2235/3224; C04B 2235/3225; C04B 2235/3246; C22C 19/03; C22C 19/05; F01D 5/284; F01D 5/288; F01D 5/28; F01D 25/005; F05D 2230/312; F05D 2230/90; F05D 2260/95; F05D 2300/15; F05D 2300/20; F05D 2300/21; F05D 2300/608; B32B 15/04; B32B 15/043; B32B 15/18; B32B 18/00; Y10T 428/12389; Y10T 428/12396; Y10T 428/12458; Y10T 428/12931; Y10T 428/12937; Y10T 428/12944; Y10T 428/12951; Y10T 428/12479; Y10T 428/12597; Y10T 428/12604; Y10T 428/12979; Y10T 428/12993; Y10T 428/12611; Y10T 428/12618; Y10T 428/2495; Y10T 428/24967; Y10T 428/24992; Y10T 428/263; Y10T 428/264; Y10T 428/265; Y10T 428/12451; Y10T 428/12486

See application file for complete search history.

(56) References Cited

U.S. PATENT DOCUMENTS

| | | |
|---|---|---|
| 2016/0168684 A1 | 6/2016 | Brosnan et al. |
| 2018/0355734 A1* | 12/2018 | Strock .................. C23C 14/024 |
| 2018/0371923 A1 | 12/2018 | Johnson et al. |
| 2019/0078215 A1 | 3/2019 | Wessels et al. |
| 2019/0211696 A1 | 7/2019 | Keshavan et al. |
| 2019/0270865 A1 | 9/2019 | Wilson et al. |
| 2019/0284673 A1 | 9/2019 | Landwehr et al. |
| 2020/0024979 A1 | 1/2020 | Jordan et al. |

OTHER PUBLICATIONS

International Search Report and Written Opinion dated Feb. 9, 2022 for PCT/US21/29327.

X. Shan et al., "Pore filling behavior of YSZ under CMAS attack: Implications for designing corrosion-resistant thermal barrier coatings", J Am Ceram Soc., Dec. 2018, pp. 5756-5770, vol. 101, Issue 12, The American Ceramic Society, Westerville, Ohio.

H.H. Yu et al., "Edge Effects in Thin Film Delamination", Acta Materialia Inc., Jan. 2001, pp. 93-107, Elsevier Science, Ltd., Amsterdam, Netherlands.

Carlos G. Levi et al., "Environmental Degradation of Thermal-Barrier Coatings By Molten Deposits", MRS Bulletin, Oct. 2012, pp. 932-941, vol. 37, Materials Research Society, Warrendale, Pennsylvania.

Uta Klement et al., "3D Analysis of Porosity in a Ceramic Coating Using X-ray Microscopy", J Am Ceram Soc., Jan. 2017, Springer, Berlin, Germany.

Solutions Flash—"Real-Time Sensor Technology Improves Process Control While Reducing Time and Cost", Oct. 2014, Oerlikon Metco AG, Wohlen, Switzerland.

"Ceramics—100HE™ coating data (English units)", Jan. 14, 2014, Progressive Surface, Grand Rapids, MI, retrieved from internet Mar. 16, 2020 https://www.progressivesurface.com/downloads/coatingdata/100%20HE%20Published%20Parameters,%20Ceramics.pdf.

* cited by examiner

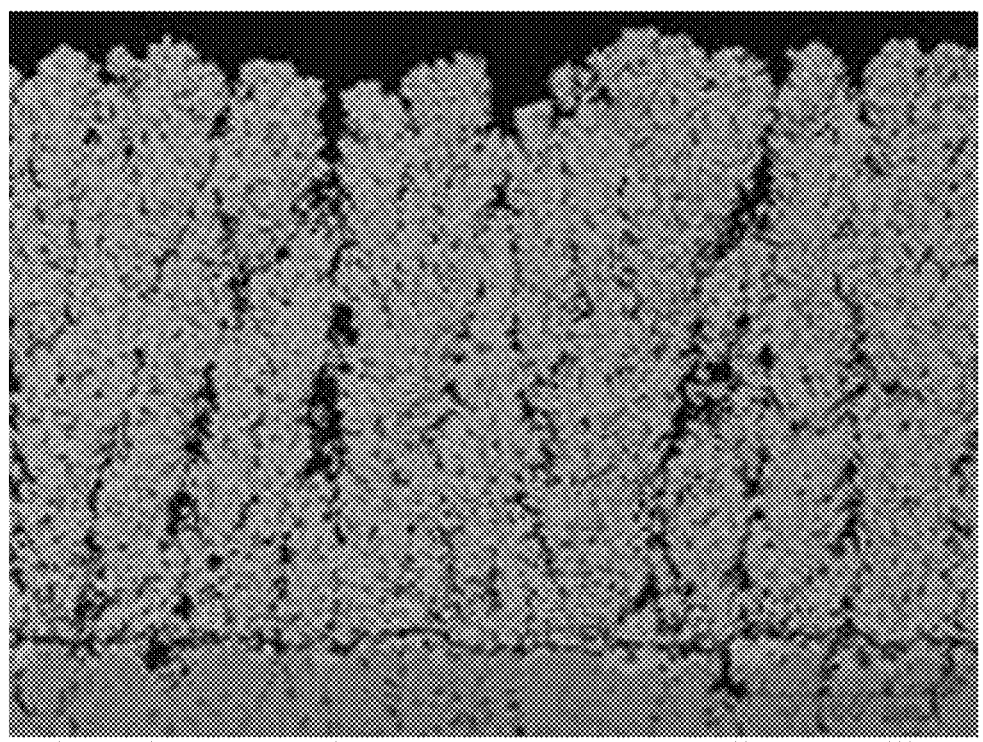
*FIG. 5*  100μm
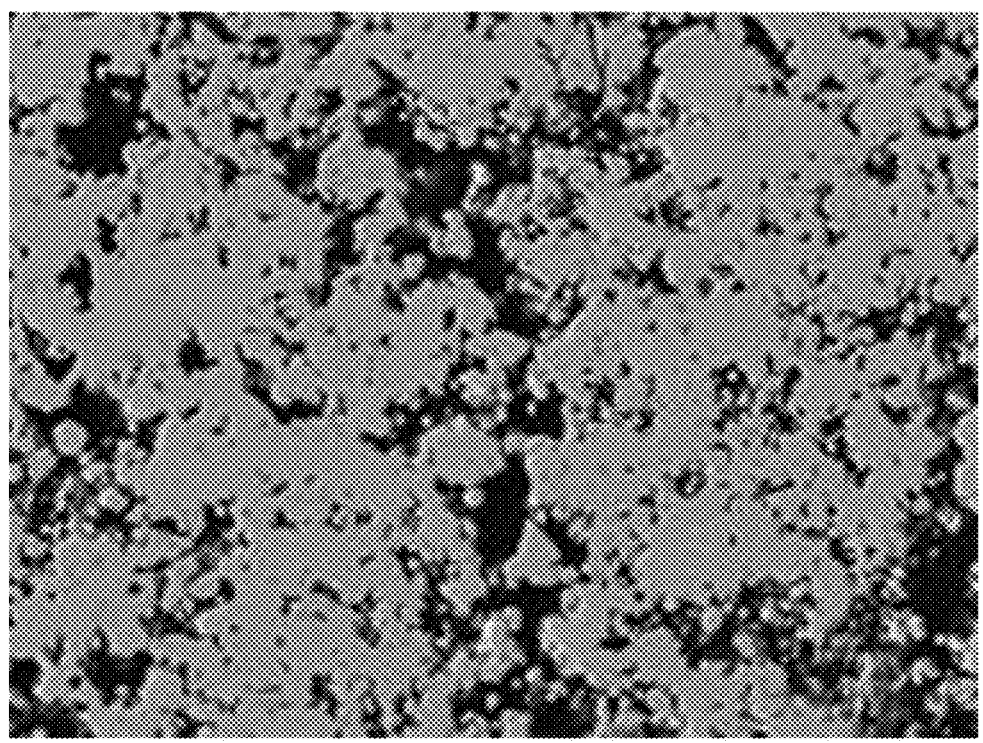
*FIG. 5A*  10μm

THERMAL BARRIER COATING

CROSS-REFERENCE TO RELATED APPLICATION

Benefit is claimed of U.S. Patent Application No. 63/016,203, filed Apr. 27, 2020, and entitled "Thermal Barrier Coating", the disclosure of which is incorporated by reference herein in its entirety as if set forth at length.

BACKGROUND

The disclosure relates to gas turbine engine ceramic thermal barrier coatings (TBC). More particularly, the disclosure relates to coatings subject to calcium-magnesium-alumino-silicate (CMAS—also known as "molten sand attack") contaminants in the hot sections of the engine.

Gas turbine engines (used in propulsion and power applications and broadly inclusive of turbojets, turboprops, turbofans, turboshafts, industrial gas turbines, and the like) include ceramic coatings used as thermal barrier coatings (TBC), environmental barrier coatings (EBC), abradable coatings, and the like. Principal application techniques include electron beam physical vapor deposition (EB-PVD) and air plasma spray (APS). Principal ceramic materials are stabilized zirconias, namely yttria-stabilized zirconia (YSZ) and gadolinia-stabilized zirconia (alternatively known as GdZ, GSZ, or GZO).

Particularly with YSZ, EB-PVD tends to produce a crystal-like columnar structure. APS tends to produce a splatted structure. Suspension plasma spray (SPS) tends to yield an equiaxed columnar structure as compared to the single crystal columns produced in EB-PVD. The EB-PVD columns have sharper and less varied boundaries with little bridging between columns compared to SPS.

There have been many proposals for addressing CMAS. Some involve applying a dense sealing layer or topcoat over a more conventional TBC layer to prevent infiltration. Others involve applying a reactive layer/topcoat which reacts with CMAS to prevent further infiltration.

United States Patent Application Publication 20190078215A1 (the '215 publication), of Wessels et al., Mar. 14, 2019, "CMAS-Resistant Thermal Barrier Coating and Method of Making a Coating thereof", the disclosure of which is incorporated by reference herein in its entirety as if set forth at length, discloses deep prior art SPS coatings as having inter-columnar gaps subject to CMAS infiltration. The '215 publication discloses combatting CMAS infiltration by reducing gap width to below 5 micrometers.

SUMMARY

One aspect of the disclosure involves a coated substrate comprising: a substrate; and a coating system comprising one or more ceramic layers. At least a first layer of one of the one or more ceramic layers is a columnar layer having as-deposited columns and intercolumn gaps. The intercolumn gaps have a mean width at least one of: at least 4.0 micrometers; and at least 1.5% of a thickness of said first layer.

In a further embodiment of any of the foregoing embodiments, additionally and/or alternatively: said intercolumn gaps have a mean width of at least 4.0 micrometers over an area of at least 4.0 cm$^2$.

In a further embodiment of any of the foregoing embodiments, additionally and/or alternatively: the substrate is a metallic substrate; and the coating system comprises a bondcoat and said one or more ceramic layers atop the bondcoat.

In a further embodiment of any of the foregoing embodiments, additionally and/or alternatively, one or more of: the metallic substrate is a nickel-based superalloy; the coated metallic substrate is a gas turbine engine component; the bondcoat is an MCrAlY or an aluminide; and the first layer is a YSZ (e.g., 7 YSZ or 8YSZ) or a GSZ (e.g., 59GdZ).

In a further embodiment of any of the foregoing embodiments, additionally and/or alternatively: the metallic substrate is a nickel-based superalloy; the coated metallic substrate is a gas turbine engine component; the bondcoat is an MCrAlY or an aluminide; and the columnar layer is a YSZ or a GSZ.

In a further embodiment of any of the foregoing embodiments, additionally and/or alternatively: the metallic substrate is a nickel-based superalloy; the coated metallic substrate is a gas turbine engine component; the bondcoat is an MCrAlY; and the columnar layer is a YSZ layer or a GSZ layer atop a YSZ layer.

In a further embodiment of any of the foregoing embodiments, additionally and/or alternatively, the gaps are as-sprayed gaps.

In a further embodiment of any of the foregoing embodiments, additionally and/or alternatively, the intercolumn gaps have mean depths of at least 100 micrometers and the mean gap width is 4.0 micrometers to 25.0 micrometers.

In a further embodiment of any of the foregoing embodiments, additionally and/or alternatively, the coated substrate of is a gas turbine engine component and the columnar layer is along a gaspath-facing surface of the component.

In a further embodiment of any of the foregoing embodiments, additionally and/or alternatively, the substrate is grooved and the coating system has open structures above the grooves.

In a further embodiment of any of the foregoing embodiments, additionally and/or alternatively, the method comprises: applying the columnar layer by suspension plasma spray.

In a further embodiment of any of the foregoing embodiments, additionally and/or alternatively, the method further comprises applying a bondcoat to the substrate prior to the applying of the columnar layer.

In a further embodiment of any of the foregoing embodiments, additionally and/or alternatively, the method further comprises: roughening the substrate or a bondcoat thereon prior to the applying of the columnar layer.

In a further embodiment of any of the foregoing embodiments, additionally and/or alternatively, the roughening is an abrasive process.

In a further embodiment of any of the foregoing embodiments, additionally and/or alternatively, the abrasive process comprises abrasive belting in two directions.

In a further embodiment of any of the foregoing embodiments, additionally and/or alternatively, a method for using the coated substrate comprises running the coated substrate in a gas turbine engine exposing the coated substrate to CMAS. The exposing causes CMAS to enter the gaps and laterally infiltrate into the columnar layer while leaving the gaps open adjacent the infiltration.

In a further embodiment of any of the foregoing embodiments, additionally and/or alternatively, the CMAS bridges gap openings while leaving gap portions therebelow open.

A further aspect of the disclosure involves, a method for manufacturing a coated substrate. The method comprises:

abrasive roughening of the substrate; applying a bondcoat to the substrate; and applying a ceramic coating layer by suspension plasma spray.

In a further embodiment of any of the foregoing embodiments, additionally and/or alternatively, the abrasive roughening comprises abrasive belting.

In a further embodiment of any of the foregoing embodiments, additionally and/or alternatively, the abrasive belting comprises abrasive belting in two directions.

In a further embodiment of any of the foregoing embodiments, additionally and/or alternatively, the abrasive belting comprises: abrasive belting with a 120-mesh or coarser grit.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is a sectional micrograph of a first example coated substrate.

FIG. 5A is an enlarged view of a column in a primary coating layer of the FIG. 5 coated substrate.

Like reference numbers and designations in the various drawings indicate like elements.

DETAILED DESCRIPTION

Figure 1:
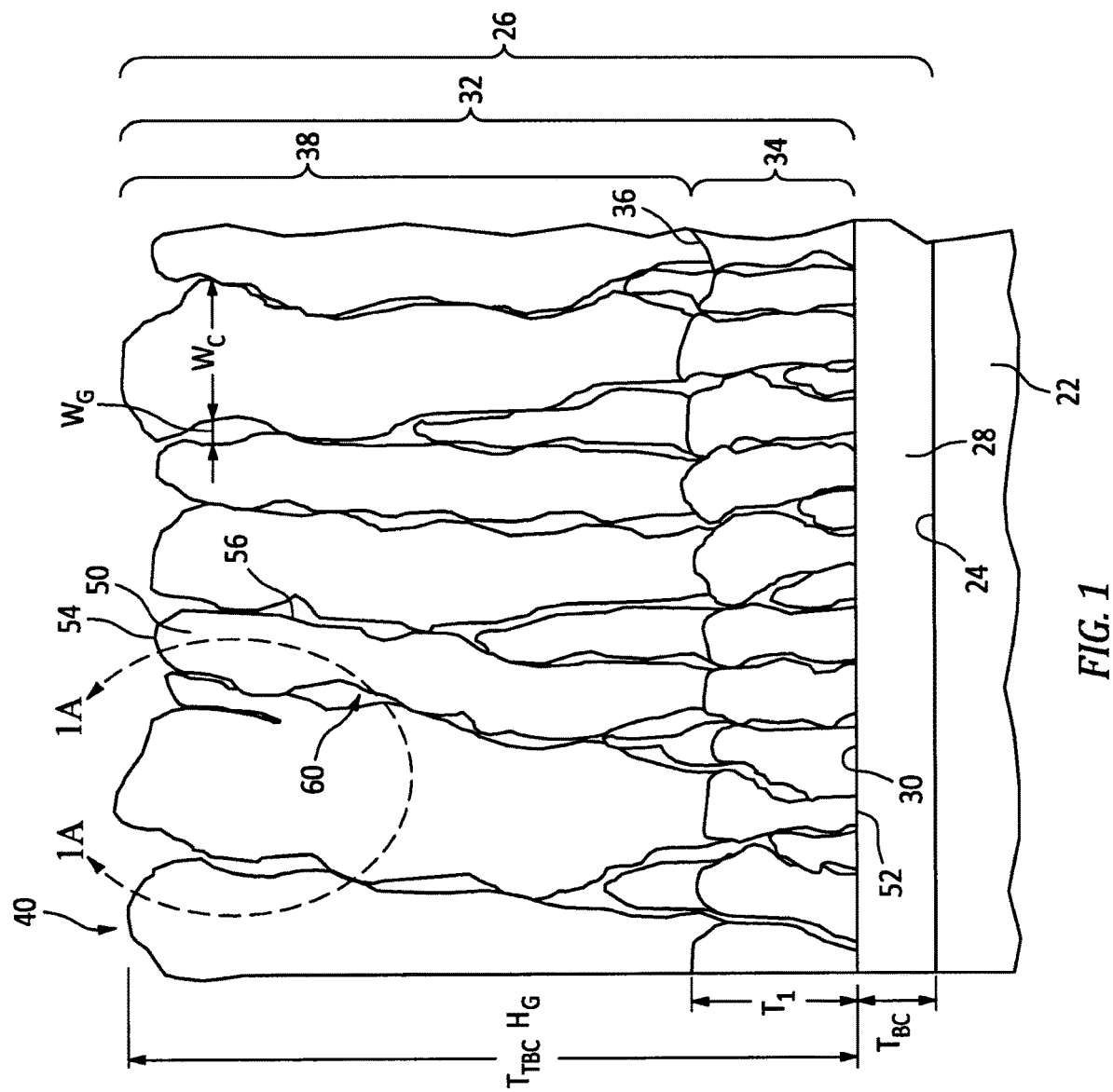
FIG. 1 is a schematic sectional view of a coated substrate.

With a traditional YSZ EB-PVD columnar structure, the narrow inter-column gaps allow the coating to be rapidly infiltrated by CMAS. Capillary action of low viscosity molten CMAS results in rapid infiltration velocities in column gaps that are about 1 micrometer in size. EB-PVD columns are dense with exception of feather structure on outer periphery. The elastic energy per area of coating associated with thermal stress achieved by cooling a TBC-coated substrate where the TBC and substrate have different thermal expansion coefficients is dictated by the modulus of and thickness of the TBC layer. CMAS infiltration into the TBC structure effectively increases the coating modulus of the infiltrated thickness which raises the elastic energy. The elastic energy increases as a function of the thickness of the CMAS-infiltrated higher modulus layer. Therefore the TBC spallation life when infiltrated by CMAS is dictated by the depth of CMAS infiltration (inversely) and the toughness of the EB-PVD column. See, Carlos Levi, John Hutchinson, Marei-helene Vidal-Sétif, & Curtis Johnson, (2012). "Environmental Degradation of TBCs by Molten Deposits", MRS Bulletin, October, 2012, Volume 37, Pages 932-941, 934, Materials Research Society, Pittsburgh, Pa.

APS splat structures are infiltrated by CMAS through similar capillary action of low viscosity molten CMAS. Inter-splat structure creates tortuous infiltration path with varied splat and pore sizes resulting in longer infiltration paths than EB-PVD. Additionally the thermal gradient in APS coatings is greater than EB-PVD due to the lower thermal conductivity (associated with APS porosity being generally perpendicular to the direction of heat transport). Assuming the APS and EB-PVD coatings were operating at the same surface temperatures the thickness of a CMAS-infiltrated layer would be thinner in the APS case. However, the weak bonding between splats in APS has a substantially lower toughness when compared with the continuous single crystal columns in EB-PVD. Therefore the relatively low TBC life under CMAS conditions in APS coatings is caused by the low intersplat strength.

Suspension plasma spray (SPS) tends to yield a columnar structure. Relative to EB-PVD columns, SPS columns are wider, with greater and more inconsistent gap openings, and are formed by consolidation of individual thermal spray splats in an equiaxed structure. SPS column widths are on the order of ~100 micrometers in diameter as compared to ~10 micrometers for EB-PVD. The gap sizes between EB-PVD columns are approximately 1 micrometer while that between SPS columns is larger and more varied ranging from 1 to greater than 10 micrometers. The SPS columnar structure consists of a compilation of fine splats on the order of a few micrometers each that accumulate into columns.

Also, the SPS splat structure may have a wide distribution of pore sizes (of pores formed between the depositing splats) for given spray parameters and the parameters may be selected to further tailor that distribution. The pore structure within the columns is larger interconnected and open to the column surface as documented by Klement, U., Ekberg, J. & Kelly, S. T. "3D Analysis of Porosity in a Ceramic Coating Using X-ray Microscopy", J Therm Spray Tech., Volume 26, pages 456-463, Jan. 31, 2017, Springer, New York, N.Y. As noted in the '215 publication, typical SPS columns have inter-columnar gaps subject to CMAS infiltration. The '215 publication discloses combatting CMAS infiltration by reducing gap width to below 5 micrometers.

As an alternative to the reduced gap width of the '215 publication, an increased gap width can provide an alternative mechanism for combatting CMAS damage to SPS thermal barrier coatings. FIG. 1 shows a coated article 20. The article comprises a substrate 22 having a surface 24. The exemplary substrates are metallic (e.g. nickel-based superalloy, cobalt-based superalloy, or the like, typically a casting). Alternative substrates are monolithic ceramics, ceramic matrix composites (CMC) (e.g., SiC—SiC), and the like. The coated article further includes a thermal barrier coating system (coating system) 26 atop the substrate. Broadly, exemplary articles are hot section components of gas turbine engines and the coating system 26 may be along gaspath-facing surfaces of such components. Exemplary components are blades (with the airfoil pressure side and suction side surfaces, platform outer diameter (OD) surface being key), vanes (with the airfoil pressure side and suction side surfaces, inner diameter (ID) shroud OD surface, and OD shroud ID surface being key), bulkheads, combustor panels, struts, and the like. Further variations are to produce abradable coatings on the inner diameter surface of blade outer airseals (BOAS) where the porosity increase may improve abradability.

The coating system 26 may include a bondcoat 28. The presence, material, and application technique of the bondcoat may be dependent on the particular substrate and use and may reflect any of numerous prior art or yet-developed bondcoats. The exemplary bondcoats are metallic (e.g., MCrAlY). Alternatives are aluminides (e.g., diffusion aluminides). The exemplary bondcoat 28 is shown having an outer surface 30. The coating system 26 further includes a thermal barrier coating (TBC) 32. The exemplary TBC is a two-layer TBC with a first layer (base layer) 34 atop the bondcoat 28 and a second layer (primary layer) 38 atop an outer surface 36 of the base layer 34 and extending to an outer surface 40.

In this example, the second layer 38 is "main" or "primary" in that it represents the thickest layer within the coating system 26 and TBC 32 and, more particularly, may represent a majority of the thickness of both said coating system 26 and TBC 32. For purposes of illustration, the coating system 26 has a thickness T, the bondcoat a thickness $T_{BC}$, the TBC a thickness $T_{TBC}$, the base layer 34 a thickness $T_1$, and the primary layer a thickness $T_2$.

As is discussed further below, the primary layer 38 has a columnar structure characteristic of application by suspension plasma spray (SPS) (e.g., powder ceramic feedstock in an ethanol carrier). In this particular example, the base layer 34 is also a columnar SPS layer. In such an exemplary situation, the columns span both layers with the base layer providing a proximal portion of many columns and the main layer forming distal portions. In alternative embodiments, the base layer may be non-columnar with the columns formed only in the main layer. In yet alternative embodiments, there is a single ceramic layer being an SPS columnar layer. Individual columns 50 extend from roots 52 to tips 54 and have lateral surfaces (sides) 56. Gaps 60 may separate the columns. FIG. 1 further shows column width $W_C$, gap width $W_G$, and gap height $H_G$ between gap bases 62 and the column tips 54. In the exemplary embodiment, $H_G$ is essentially the same as $T_{TBC}$. As is discussed further below, spray deposition parameters are selected to broaden gap width $W_G$ contrary to conventional wisdom.

For example, a reduced droplet size present in the plume would result in a greater influence by the gas stream on particle (droplet) trajectory as it approached the target surface. This means a smaller droplet will have a shallower average impingement angle with the substrate which would result in a greater shadowing effect from neighboring columns and therefore and increased gap size. Droplet size can be reduced through multiple methods including higher gas velocity, lower suspension viscosity, and lower suspension surface tension.

Also, increasing surface roughness (discussed further below) increases the shadowing effects that create the separation of columns. Increased surface roughness can be through different grit blasting intensities (e.g., after bondcoat application) or by creating a larger scale surface texture (coarse abrasive belting, milling, knurling, laser etching, or the like either before or after bondcoat application).

More broadly, the gaps 60 represent inter-column porosity. The particular disordered nature of column formation often means that there is great variation in gap width and intermittent bridging of the gaps between columns. However, the distinct columnar structure is still visible in micrographic section.

Figure 1A:
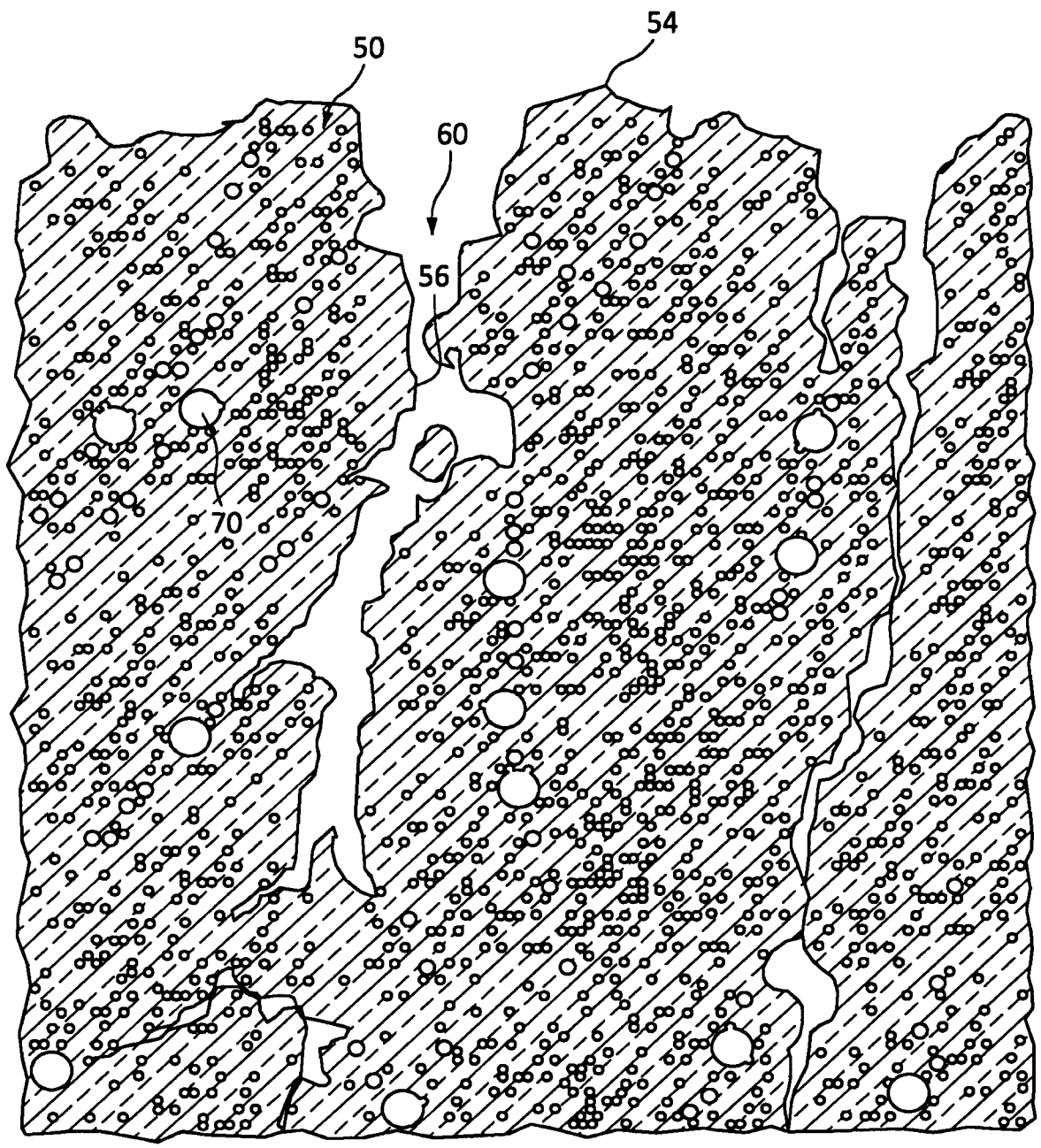
FIG. 1A is an enlarged schematic view of columns in a primary coating layer of the FIG. 1 coated substrate.

Additionally, there is intra-column porosity. FIG. 1A shows internal pores 70 within the columns 50. The distribution and size of the pores 70 (e.g., individual pore size and overall intra-column porosity) may also be a relevant consideration. Instead of being selected to resist lateral infiltration of CMAS, the size and distribution of the pores 70 may be selected to draw CMAS laterally into the columns to resist narrowing and filling of the gaps. By drawing the CMAS laterally into the columns and out of the column gaps, the elastic modulus of the infiltrated coating does not increase significantly.

Figure 2:
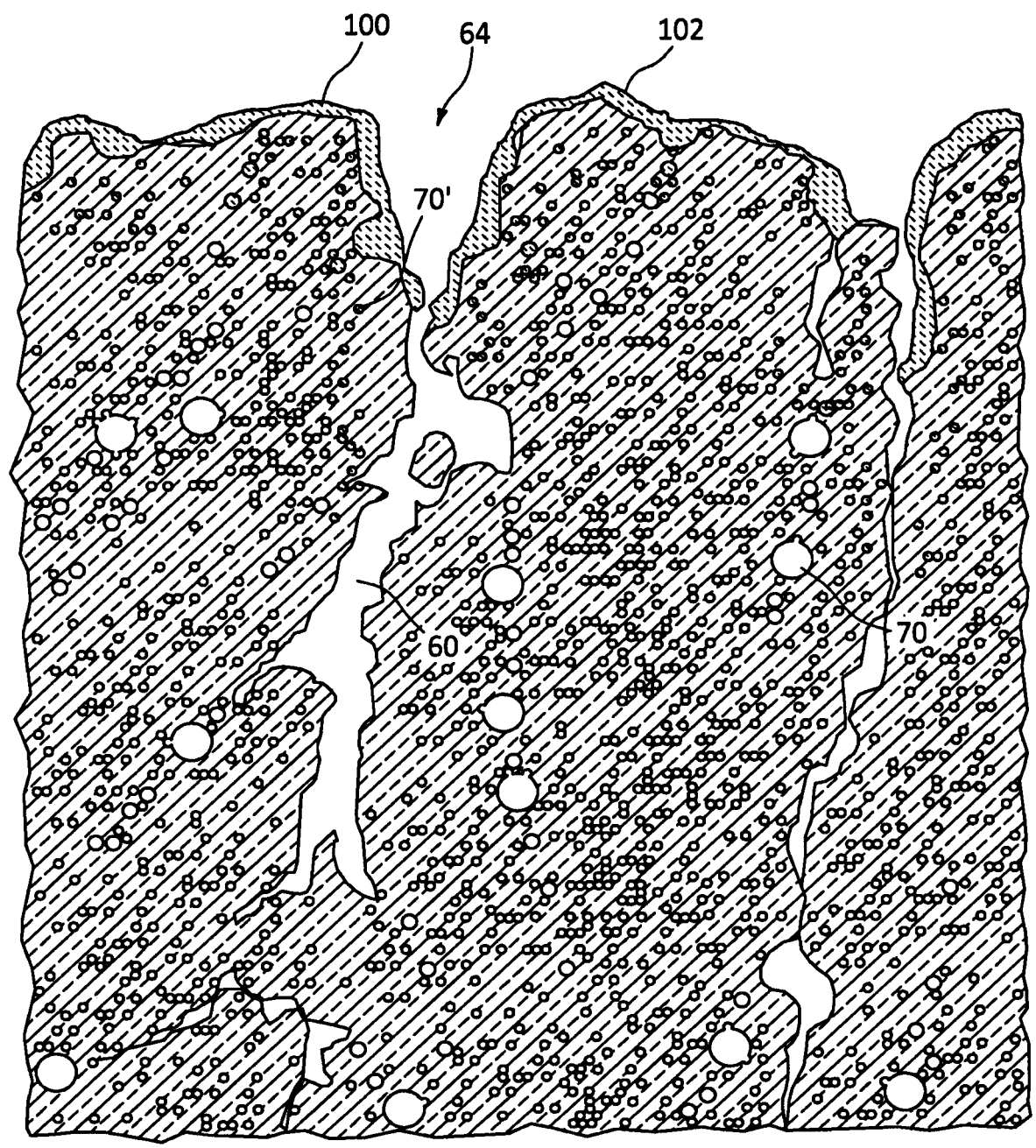
FIG. 2 is a schematic sectional view of the FIG. 1A coated substrate in-service.
Figure 3:
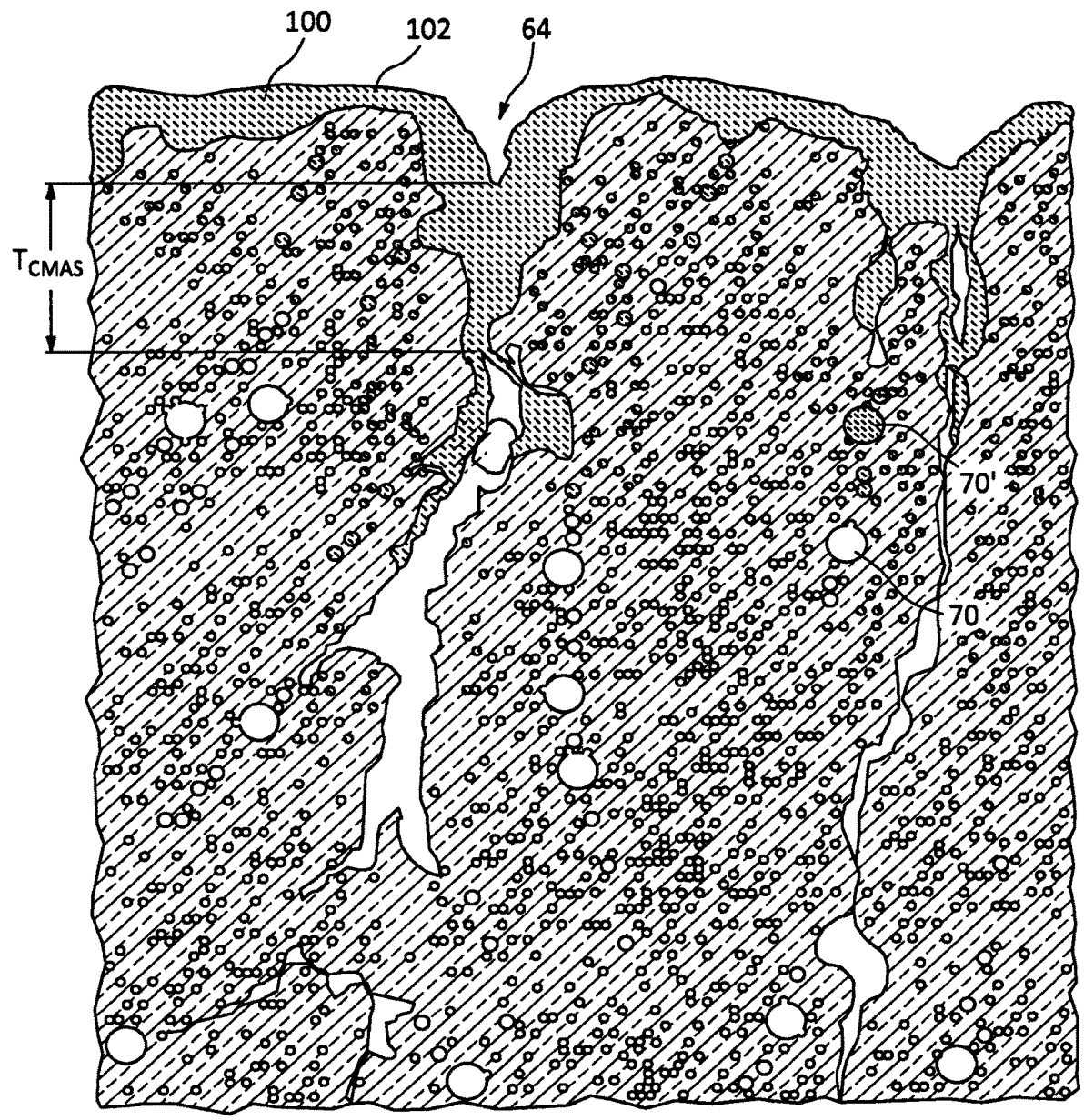
FIG. 3 is a further schematic sectional view of the FIG. 1 coated substrate in-service.

FIGS. 2 and 3 show the article 20 after service in a CMAS-inducing environment with a CMAS accumulation 100 atop the TBC 32. FIG. 3 represents a later stage after greater CMAS exposure. The exemplary accumulation 100 is shown having an outer surface 102 and, at least by the FIG. 3 service duration, having portions bridging the gap 60 openings 64. The relatively large width of the gaps 60 reduces the capillary driving force for CMAS infiltration. Additionally, the intra-column porosity may laterally draw out from the gaps 60 CMAS that has infiltrated, leaving respective intra-column cavities formed by the gaps 60 beneath the CMAS accumulation 100. This dynamic of reduced infiltration and improved lateral exfiltration from the gaps 60 may increase the service life. Eventually, as the intra-column pores 70 fill (becoming filled pores 70'), the exfiltration will slow and the gaps 60 will eventually fill (stage not shown) and the coating will fail.

The intra-column porosity 70 may, thus, be configured to delay the time before the gaps begin to fill. The gap filling will increase the modulus of the infiltrated layer and drive spallation.

FIG. 3 further shows the thickness $T_{CMAS}$ of the accumulation 100 at the gaps. $T_{CMAS}$ is the vertical height of the portion of an individual gap that has been filled and bridged by CMAS. The average values of all $T_{CMAS}$ can describe the layer that will act as a continuous material with higher in-plane modulus that the coating of FIG. 1. This continuous $T_{CMAS}$ layer with its high modulus will increase the total stress on the coatings system. Once the average $T_{CMAS}$ reaches a critical threshold, spallation of the partial or complete coating thickness will occur. The time to reach this critical $T_{CMAS}$ thickness is dependent on the coating material properties including toughness and modulus but also on the size of the gap 60 openings 64 and the volume of porosity 70 that can exfiltrate CMAS from gaps 60.

Figure 4:
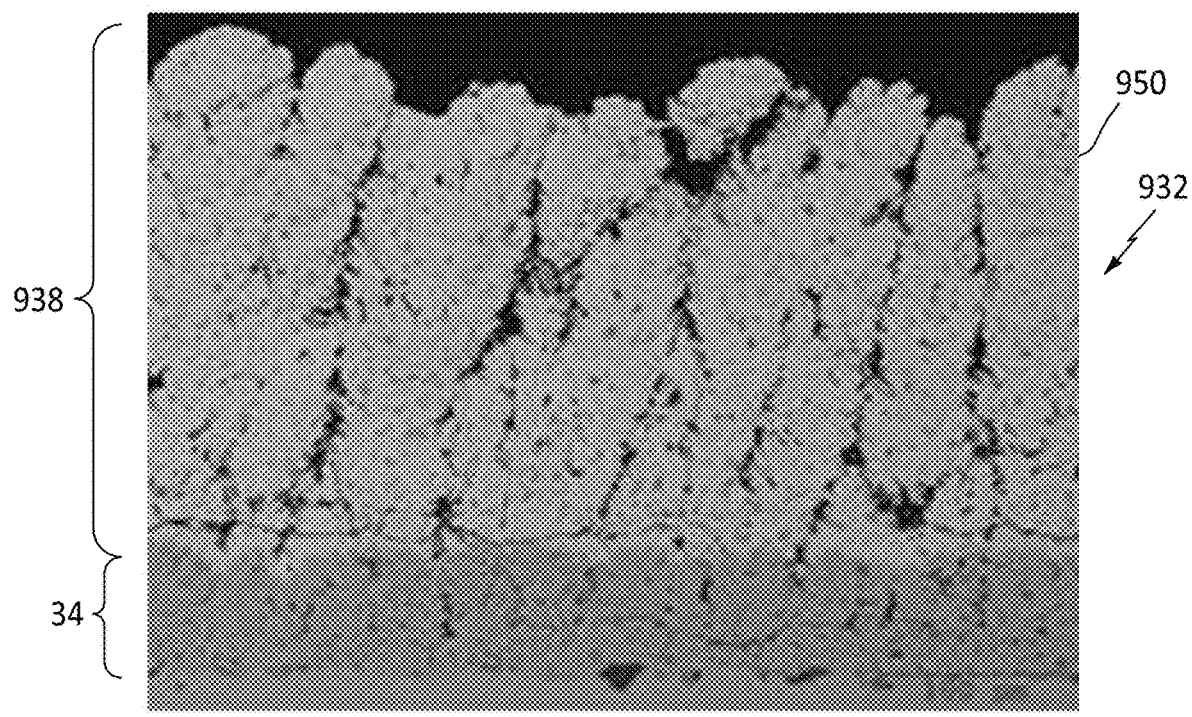
FIG. 4 is a sectional micrograph of a baseline coated substrate.

FIG. 4 shows a baseline TBC 932 having a base layer 34 and a primary layer 938. Further examples discussed below preserve the base layer 34 and change parameters of the primary layer. Yet other examples may change parameters of the base layer. The distinct columns 950 are visible as are gaps between. However, the gaps vary between heavily bridged (e.g., the two columns in the left of the view) and much less bridged (between the right of those two columns and the next column). Typical gap width may be in the vicinity of 2 micrometers to 3 micrometers and may be determined via image analysis.

Figure 16:
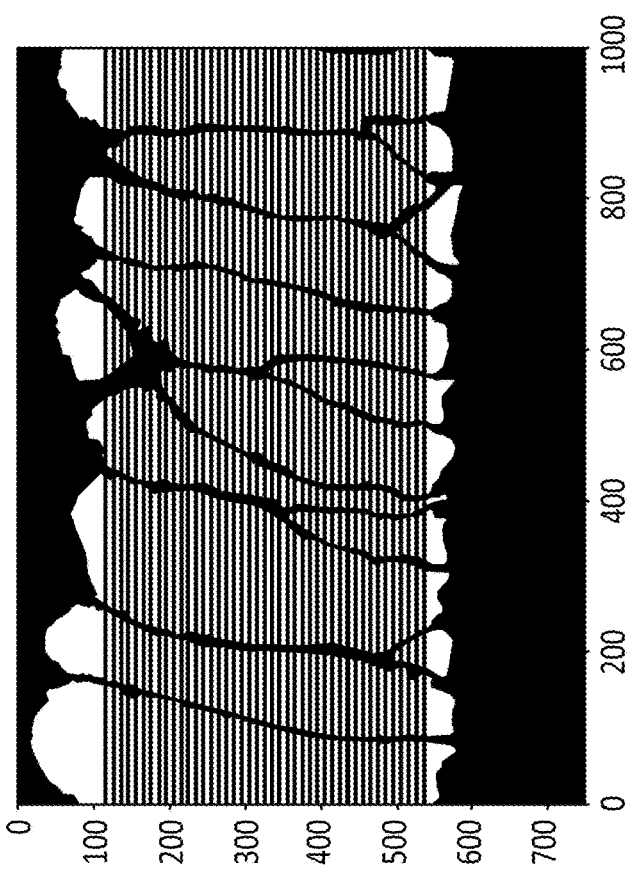
FIG. 16 is a black/white thresholded image of the FIG. 4 micrograph with an overlay of measurement lines.
Figure 19:
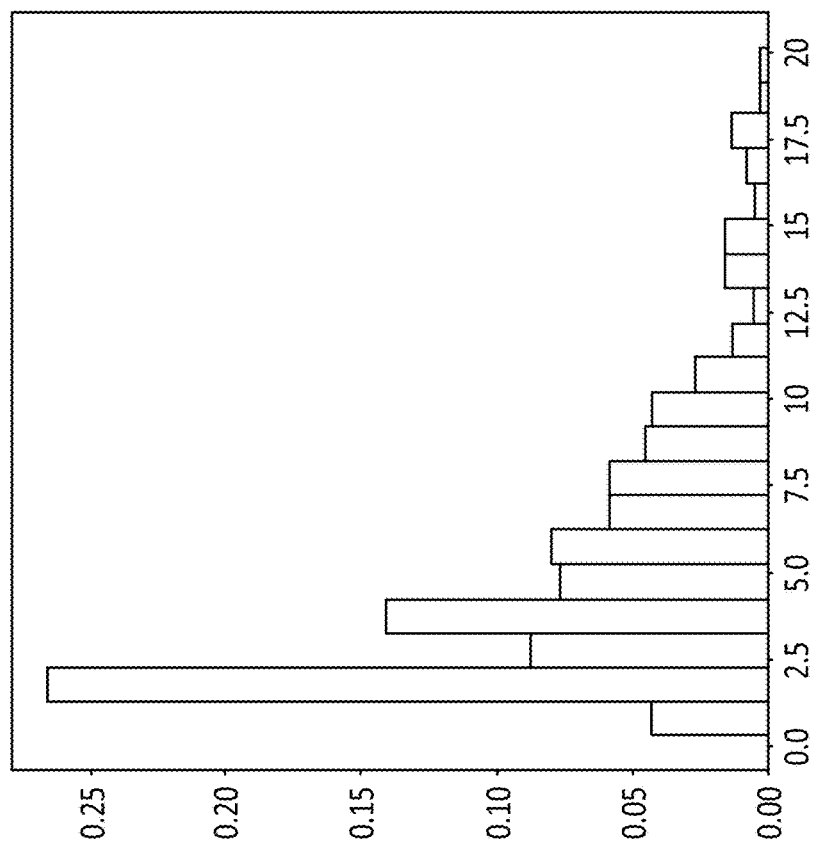
FIG. 19 is a histogram of the column gap widths measured at the FIG. 18 measurement lines.

An exemplary gap measurement process involves image thresholding and analysis of the thresholded image. FIG. 16 shows a black/white thresholded version of the FIG. 4 micrograph image.

Several examples of preparing the thresholded image may involve a neural network implementation. The neural network implementation may be based on learning from manual iterations. For example, in a manual iteration, the technician may take an image, tag individual columns or individual column objects (where columns have different protrusions out of the image plane so that one apparent segmented column is formed by multiple actual columns). The manual operation may then turn the column-selected image into a binary mask. The technician may apply the line array and perform analysis. However, this is particularly optional as the application of the array and the analysis may more easily be directly programmed than the initial identification of columns. In the manual or automated process, the column widths are then tallied.

In an example of the process, in a first step, a technician loads the image into image processing software (e.g., written in the Python programming language of the Python Software Foundation, Beaverton, Oreg.). In one example, the image is a 3-channel (RGB) image.

Figure 24:
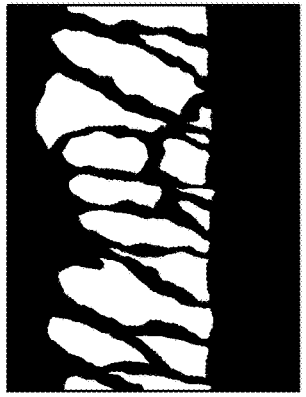
FIG. 24 is a drawing of an initial annotated micrograph highlighting column features in a single solid color represented by hatching in the drawing.

In a second step (which may precede, follow or occur simultaneously), the technician loads the image into some form of graphical program (an image editor, a presentation program such as Microsoft Corporation's PowerPoint presentation software, or the like). The technician using the graphical program, manually annotates the images to outline and segment individual column features (columns or separate sections of columns depicted in the image). The annotation may draw shapes just within the boundary of each column feature/segment. The technician fills the shapes with a color fill (e.g., pure yellow color (RGB=[255,255,0]) in an example). Edge color is assigned as black. In the PowerPoint software example, the background image plus all the yellow filled column segment shapes are selected and grouped together as single image ("Group All") by the technician. The grouped image (FIG. 24) is now saved by the technician as a new image. For purposes of reproducibility herein, the FIG. 24 (also FIG. 25) representation shows hatching on a line drawing where the solid color would be on the micrograph.

Figure 25:
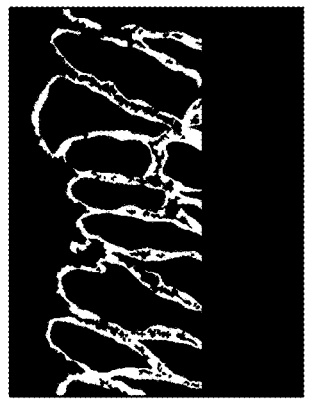
FIG. 25 is a drawing of the annotated image cropped back to original image size.

If some of the manually added shapes extend past the border of the original image, the technician crops the "grouped" image using the dimensions of the original image so that they are the same size (FIG. 25).

Then the technician loads the grouped image into the image processing software.

Figure 26:
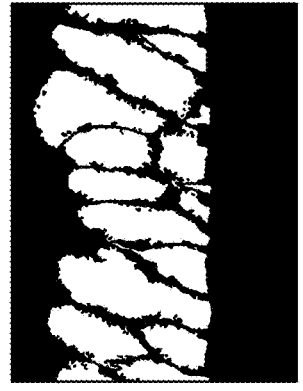
FIG. 26 is a preliminary binary mask processed from the annotated image.
Figure 27:
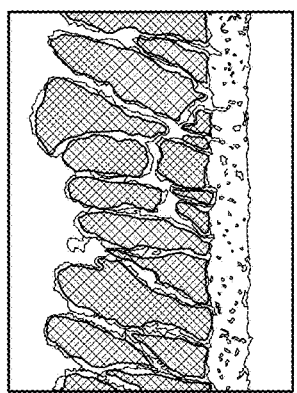
FIG. 27 is drawing of a cleaned and color-tagged low fidelity mask.

The image processing software script applies simple thresholding for colored (yellow in the example) pixels to find and separate all shapes as distinct objects and create a single binary mask (i.e., indicating a column or not) (FIG. 26). There are usually some small artifacts that are created either by overlapping power point shapes or Python, so the Python script cleans up the image to remove these small artifacts that are below a certain size limit (FIG. 27). In the example, the script also assigns a unique color to each column object to aid viewing. For purposes of illustration, FIG. 27 labels colors of the image with labels C1-C17.

Figure 28:
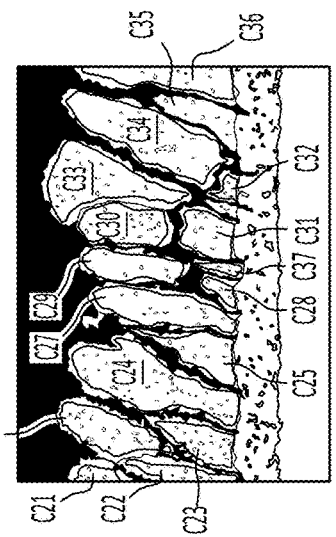
FIG. 28 is a drawing of an overlay view of the low fidelity mask on the original image.

For visualization, the script overlays the processed low fidelity mask on the original image (FIG. 28). Such a result may appear acceptable but may typically be missing about 5-10% of the columns, especially at the borders (image edges). Thus, discussed below, a further higher fidelity mask may be generated for improved accuracy. In this example, the script or technician also assigns colors to aid viewing. For purposes of illustration, FIG. 28 labels colors of the image with labels C21-C37. These may be the same (or similar) to C1-C17 or different. FIG. 28 also show solid line borders of the coloration within the columns.

Figure 29:
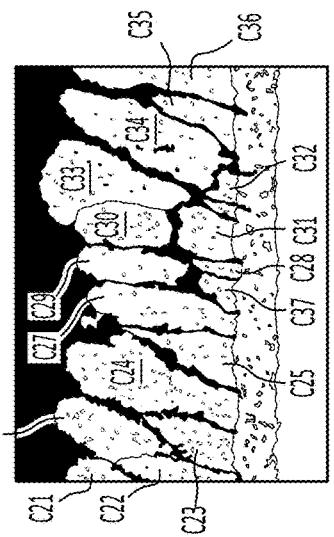
FIG. 29 is a view of an image subtracting the low fidelity mask from the original image.
Figure 30:
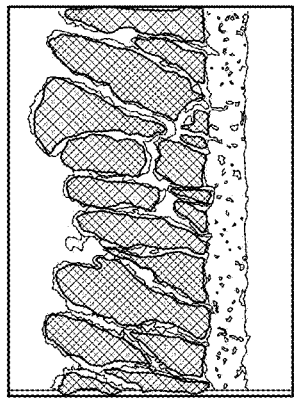
FIG. 30 is a view of a mask regenerated from the low fidelity mask based upon allocation of the subtracted pixels.

To create higher fidelity masks, the script applies grayscale pixel threshold that finds all pixels above the substrate/bondcoat or base layer (if any) that are part of the primary layer. The script then subtracts from the initial image the pixels that have already been labeled in the low fidelity mask (FIG. 29). The script then assigns unclassified pixels to the closest column object by Euclidean distance (FIG. 30).

Figure 31:
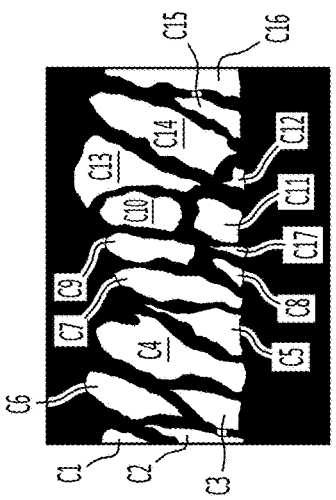
FIG. 31 is a view of a mask generated by eroding the pixel-corrected mask of FIG. 30.

At this stage the resulting mask labels are very closely abutting and sometimes there are small floating islands (e.g., artifacts of an out-of-plane column) that should not be included as part of a coating column object in the mask. So the script again removes small artifacts to remove this noise. Then the script subjects each column object to a binary erosion operation which shrinks the corresponding mask portion by a certain size, increasing separation between neighboring columns (FIG. 31).

Figure 32:
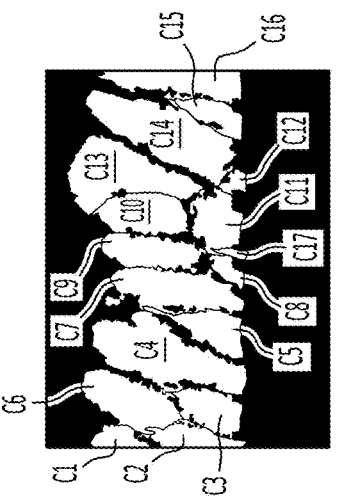
FIG. 32 is a view of the final binary mask generated from the eroded mask of FIG. 31.

At this point, there is 2D array where the pixel color corresponds to unique object identifier number. For instance, all pixels that are zero (black) belong to the background. All pixels of 1 (white) belong to a single column object, and so forth for each remaining object and its color. A simple threshold operation (pixel value>0) will generate a binary coating column mask (FIG. 32) which is used for analysis like the coating column gap width assessment.

Once the binary mask is processed using the workflow discussed above, the script then places the N equally spaced lines between the upper limit and lower limit of the primary layer minus a certain buffer area. As noted above, this buffer area is introduced to avoid measuring as gaps open spaces that are not actually gaps.

Because the script measures distance between consecutive white pixels along each line (i.e., the width of the black space between columns), it is important to make sure each line starts and ends in a column object or white pixel to not over-estimate gaps based upon removed column portions at the two borders.

Thus, each line consists of a series of 0's and 1's, where the 1 indicates the pixel is in a column object and 0 if it is not. Next, the script calculates the difference between consecutive values—which results in zero if nothing changes and ±1 if it changes from 0 to 1 or 1 to 0. Using the coordinates of these inflection points, the script directly calculates gap spacing which the script converts from pixel units to a linear dimension (e.g., micrometers) with the corresponding scale factor.

FIG. 16 also includes an array of straight measurement lines parallel to the general substrate surface. Gap widths along each line are measured (via programmed analytical tools). In this exemplary embodiment, the lines are at an even spacing starting from a lowermost line spaced slightly above the substrate to an uppermost line just below the terminal openings of the lowest gap. The exemplary spacing is 5.0 micrometers. An exemplary line count is a matter of choice, but 1.0 to 20.0 micrometers spacing would be illustrative for typical uses.

Even a single line may be used and, at the other end, an upper end on line count is limited only by desired expenditure of labor and computing hours as well as image resolution. Thus, an exemplary range is 1 to 100 lines, more particularly, 10 to 100 lines or 10 to 50 lines.

Figure 17:
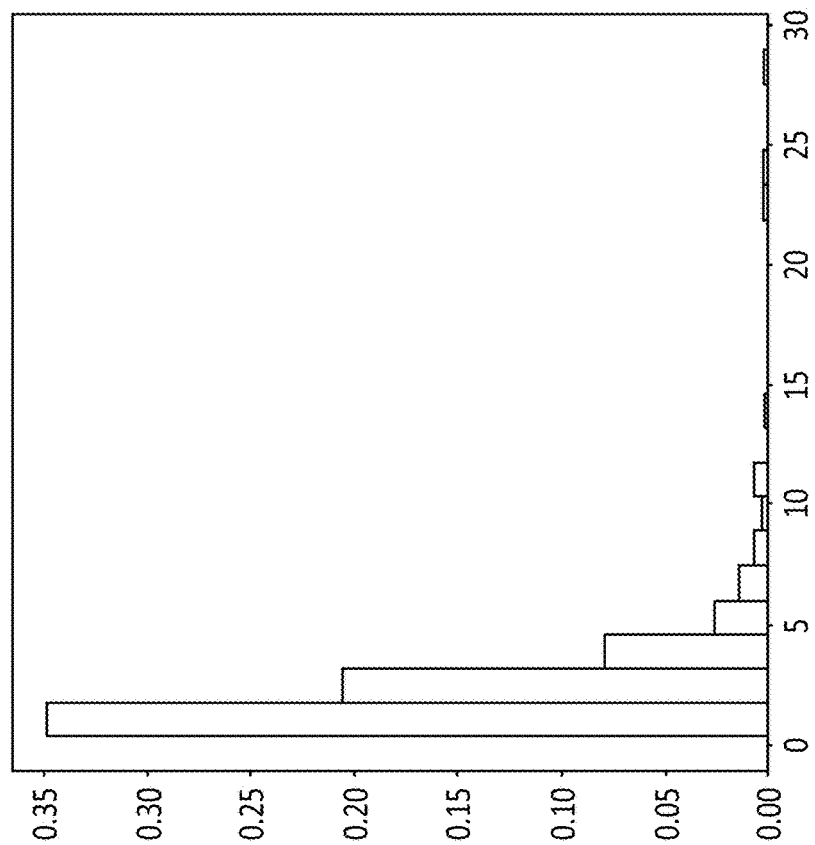
FIG. 17 is a histogram of the column gap widths measured at the FIG. 16 measurement lines.

FIG. 17 is a histogram of gap widths. The X axis shows gap width in micrometers. The Y axis is a fraction of the number of gaps of a given width. In this example, the mean gap width is 2.4 micrometers (which is about 1% of the layer thickness) based on gap count rather than being weighted by gap width. The min. gap width is 0.3 micrometers, the max. gap width is 29.1 micrometers, the twenty-fifth percentile gap width is 1.3 micrometers, and the seventy-fifth percentile gap width is 2.6 micrometers.

Figure 4A:
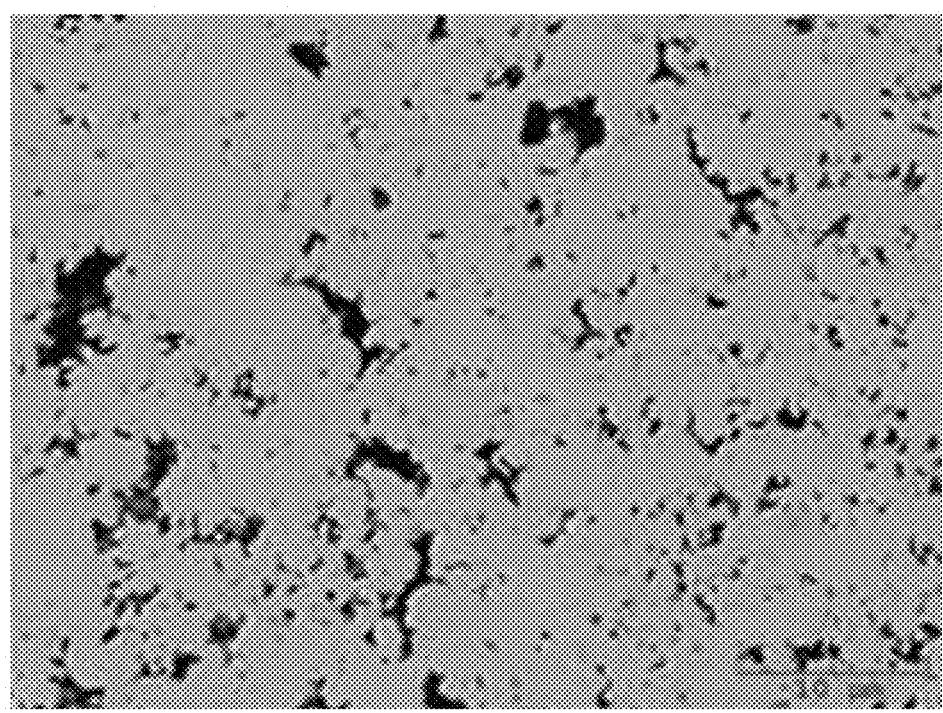
FIG. 4A is an enlarged view of a column in a primary coating layer of the FIG. 3 coated substrate.

FIG. 4A shows intra-column porosity. In particular, there is a total amount of porosity volume (seen as area in micrograph cross-section) present composed of a range of different pore sizes. There are a small number of pores with greater than 2 square micrometers area (cut plane section) and a large number of pores with less than 2 square micrometers area. The larger pores tend to be associated with (e.g., immediately adjacent to) the gap structure between the columns while the smaller pores are generally formed between individual splats in the columns. Application parameters for the TBC 932 and additional examples are shown in Table I. In particular, Table I shows parameters for the baseline of FIG. 4, five tested examples of FIGS. 5-9, and additional specific embodiments and ranges. In the baseline and five examples, the gun used for both layers was a 100HE™ plasma spray system of Progressive Surface, Grand Rapids, Mich. The first layer of material was a YSZ, namely, 8YSZ. The second layer of material was a GdZ, namely, 59 wt. percent gadolinia in zirconia (59Gdz). The base layer thickness $T_1$ was approximately 65 micrometers. The primary layer thickness $T_2$ was approximately 260 micrometers. As is discussed further below, the examples reflect changes (relative to the baseline) in one or more of power, total gas flow rate, gas composition (relative concentration/rates of argon, hydrogen, and nitrogen), suspension feed rate, nozzle exit diameter, and gun standoff. An exemplary $T_2$ range is 100 micrometers to 400 micrometers In various implementations, parameters of the particular guns used will influence power, flow rate, feed rate, standoff, etc. Nevertheless, similar modifications may be made to baseline processes using other guns and other baseline parameters. Furthermore, yet other modifications may be made.

TABLE I

| Ex/ | Nozzle exit (in) | 1st (Base) Layer (optional) | | | | | | | 2nd (Primary) |
|---|---|---|---|---|---|---|---|---|---|
| | | Material | Power (kW) | Ar (scfh) | $H_2$ (scfh) | $N_2$ (scfh) | Feed rate (ml/min) | Standoff (in) | Layer Material |
| Baseline | 0.375 | 8YSZ | 105 | 180 | 120 | 120 | 90 | 2.75 | 59GdZ |
| Ex. 1 | 0.375 | 8YSZ | 105 | 180 | 120 | 120 | 90 | 2.75 | 59GdZ |
| Ex. 2 | 0.450 | 8YSZ | 105 | 180 | 120 | 120 | 90 | 2.75 | 59GdZ |
| Ex. 3 | 0.375 | 8YSZ | 105 | 180 | 120 | 120 | 90 | 2.75 | 59GdZ |
| Ex. 4 | 0.375 | 8YSZ | 105 | 180 | 120 | 120 | 90 | 2.75 | 59GdZ |
| Ex. 5 | 0.375 | 8YSZ | 105 | 180 | 120 | 120 | 90 | 2.75 | 59GdZ |
| Range 1A | 0.375 | 8YSZ | 105 | 180 | 120 | 120 | 90 | 2.75 | 59GdZ |
| Range 1B | 0.375 | 8YSZ | 105 | 180 | 120 | 120 | 90 | 2.75 | 59GdZ |
| Range 1C | 0.375 | 8YSZ | 105 | 180 | 120 | 120 | 90 | 2.75 | 59GdZ |
| Range 2A | 0.375 | 8YSZ | 105 | 180 | 120 | 120 | 90 | 2.75 | 59GdZ |
| Range 2B | 0.375 | 8YSZ | 105 | 180 | 120 | 120 | 90 | 2.75 | 59GdZ |
| Range 2C | 0.375 | 8YSZ | 105 | 180 | 120 | 120 | 90 | 2.75 | 59GdZ |
| Range 3A | | | | | | | | | 8YSZ |
| Range 3B | | | | | | | | | 8YSZ |
| Range 3C | | | | | | | | | 8YSZ |
| Range 4A | | | | | | | | | 8YSZ |
| Range 4B | | | | | | | | | 8YSZ |
| Range 4C | | | | | | | | | 8YSZ |

TABLE I-continued

|  | 2nd (Primary) Layer | | | | | | |
|---|---|---|---|---|---|---|---|
| Ex/ | Power (kW) | Ar (scfh) | $H_2$ (scfh) | $N_2$ (scfh) | Feed rate (ml/min) | Standoff (in) | Total gas flow (scfh) |
| Baseline | 95 | 180 | 120 | 120 | 90 | 3.00 | 420 |
| Ex. 1 | 95 | 120 | 80 | 80 | 90 | 3.00 | 280 |
| Ex. 2 | 95 | 220 | 80 | 80 | 90 | 3.00 | 380 |
| Ex. 3 | 85 | 120 | 120 | 120 | 90 | 3.50 | 360 |
| Ex. 4 | 95 | 300 | 120 | 120 | 90 | 3.00 | 540 |
| Ex. 5 | 95 | 180 | 120 | 120 | 45 | 3.00 | 420 |
| Range 1A | 70-105 | 100-180 | 60-160 | 60-160 | 10-90 | 2.75-4.50 | 220-420 |
| Range 1B | 75-95 | 120-180 | 60-120 | 60-120 | 10-90 | 2.75-4.50 | 240-420 |
| Range 1C | 75-95 | 120-180 | 80-120 | 80-120 | 25-90 | 2.75-4.00 | 280-420 |
| Range 2A | 70-105 | 120-400 | 80-160 | 80-160 | 10-90 | 3.00-4.50 | 420-640 |
| Range 2B | 70-105 | 200-400 | 80-160 | 80-160 | 10-90 | 3.00-4.50 | 440-640 |
| Range 2C | 70-105 | 240-400 | 100-160 | 100-160 | 25-90 | 3.00-4.00 | 480-640 |
| Range 3A | 80-105 | 100-180 | 60-160 | 60-160 | 10-90 | 2.75-4.50 | 220-420 |
| Range 3B | 85-105 | 120-180 | 60-120 | 60-120 | 10-90 | 2.75-4.50 | 240-420 |
| Range 3C | 85-105 | 120-180 | 80-120 | 80-120 | 25-90 | 2.75-4.00 | 280-420 |
| Range 4A | 80-105 | 120-400 | 80-160 | 80-160 | 10-90 | 2.75-4.50 | 420-640 |
| Range 4B | 80-105 | 200-400 | 80-160 | 80-160 | 10-90 | 2.75-4.50 | 440-640 |
| Range 4C | 80-105 | 240-400 | 100-160 | 100-160 | 25-90 | 2.75-4.00 | 480-640 |

Other YSZ and GdZ may be used in place of the 8YSZ and 59 GdZ. In particular, 7YSZ would be fully substitutable for 8YSZ.

The Table I Range 1A-C and Range 3A-C ranges feature less total gas flow per gun exit area to reduce particle velocity and increase intracolumn porosity primarily. Lower power and greater standoff can additionally increase intra-column porosity. Lower feed rate can increase gap size and decrease average column diameter.

The Table I Range 2A-C and Range 4A-C ranges increase total gas flow per gun exit area to increase gap size but reduce total porosity. Reduction in power and increased standoff will recover or increase intracolumn porosity due to lower particle temperature at point of deposition.

Further variations may involve modifying the base layer (if present). One group of variations involves seeking to alter it similarly to the primary layer. For example, the modified YSZ parameters of the Range 3 or 4 families may be used for a base layer covered by a GdZ second layer according to the Range 1 or 2 families. Nevertheless, toughness or other factors may favor use of the baseline YSZ base layer because, due to temperature gradient across the coating thickness, CMAS infiltration in lower depths may be less of a problem. In that vein, The baseline YSZ base layer may also be used with the Range 3 or 4 family primary layer.

FIG. 5 shows the effect of reduced particle velocity relative to the baseline. In this example, it is achieved by merely evenly reducing flow rates by one third and maintaining other parameters. The most significant result is an increase in intra-column porosity (FIG. 5A versus FIG. 4A). In particular, total porosity increased from about 20% to about 32% as measured by image analysis from micrographs at 250× magnification. The fraction of pores greater than 2 square micrometers (of sectional area) increased from about 13% (66% of the total porosity (in sectional area)) to about 25% (79% of porosity), while the pores less than 2 square micrometers decreased minimally from 7.0% to 6.8% (of sectional area). Additionally, the average column diameter remained approximately similar.

Figure 6:
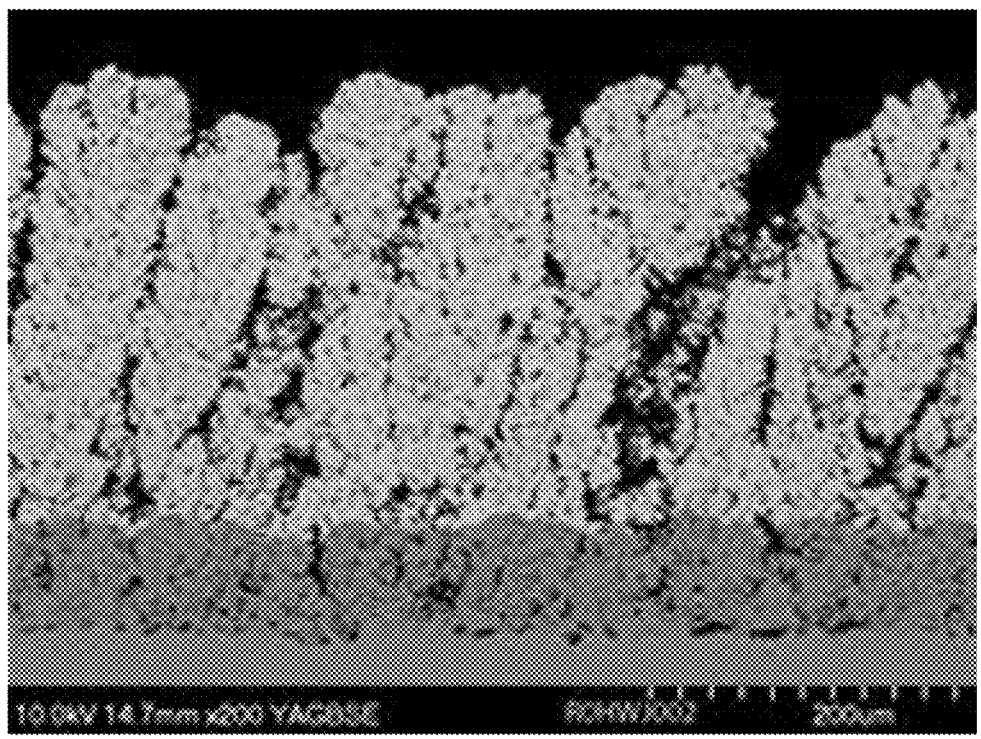
FIG. 6 is a sectional micrograph of a second example coated substrate.
Figure 6A:
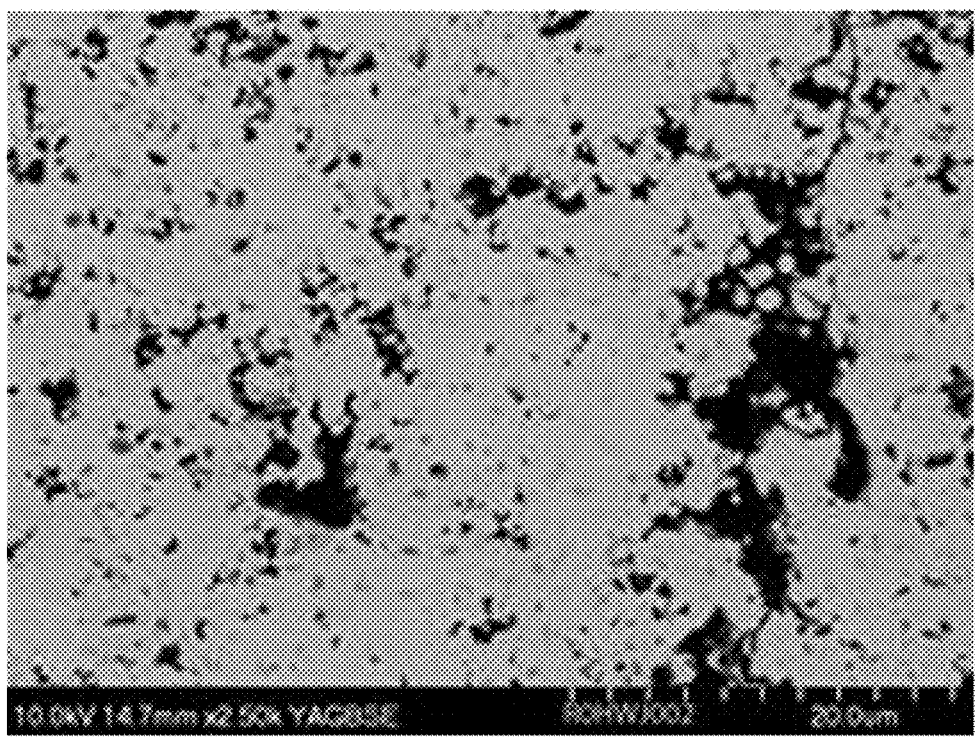
FIG. 6A is an enlarged view of a column in a primary coating layer of the FIG. 6 coated substrate.

FIG. 6 shows an alternative mechanism for reducing particle velocity by increasing the nozzle exit diameter while also reducing net gas flow. In this particular example, the gas composition is changed to have relatively high argon. The increased fraction of the inert argon in the gas reduces the heat addition from use of nitrogen and hydrogen in the plasma. A relatively heavy gas like argon maintains or increases particle velocity. Intra-column porosity is also increased relative to the baseline. Gap size is generally similar to the baseline or slightly increased.

Figure 7:
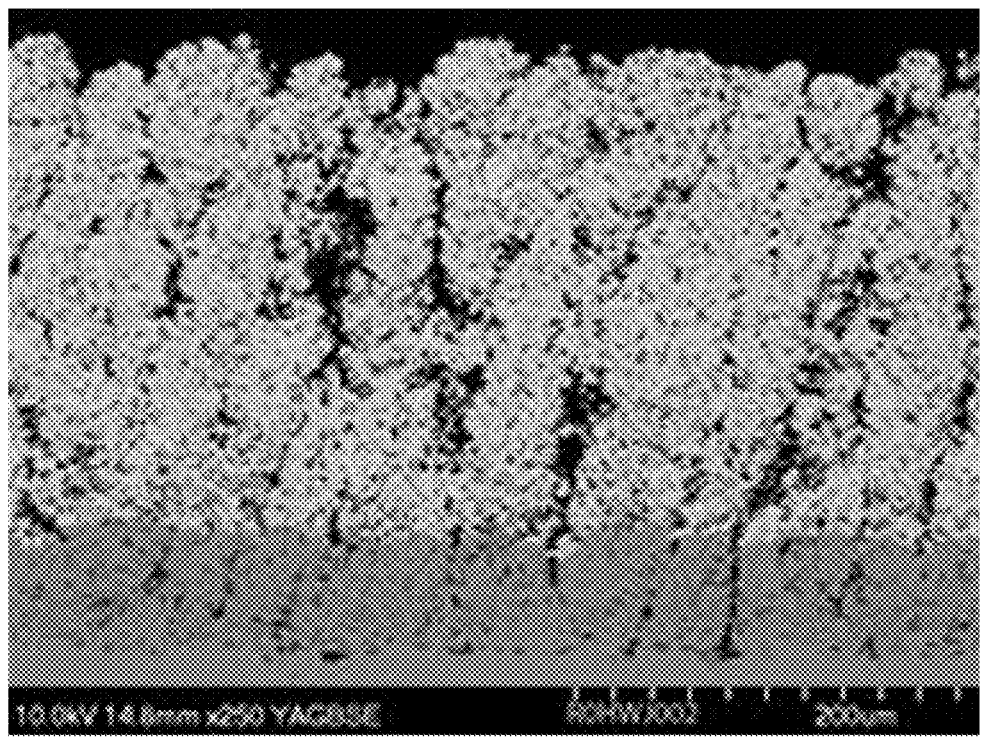
FIG. 7 is a sectional micrograph of a third example coated substrate.
Figure 7A:
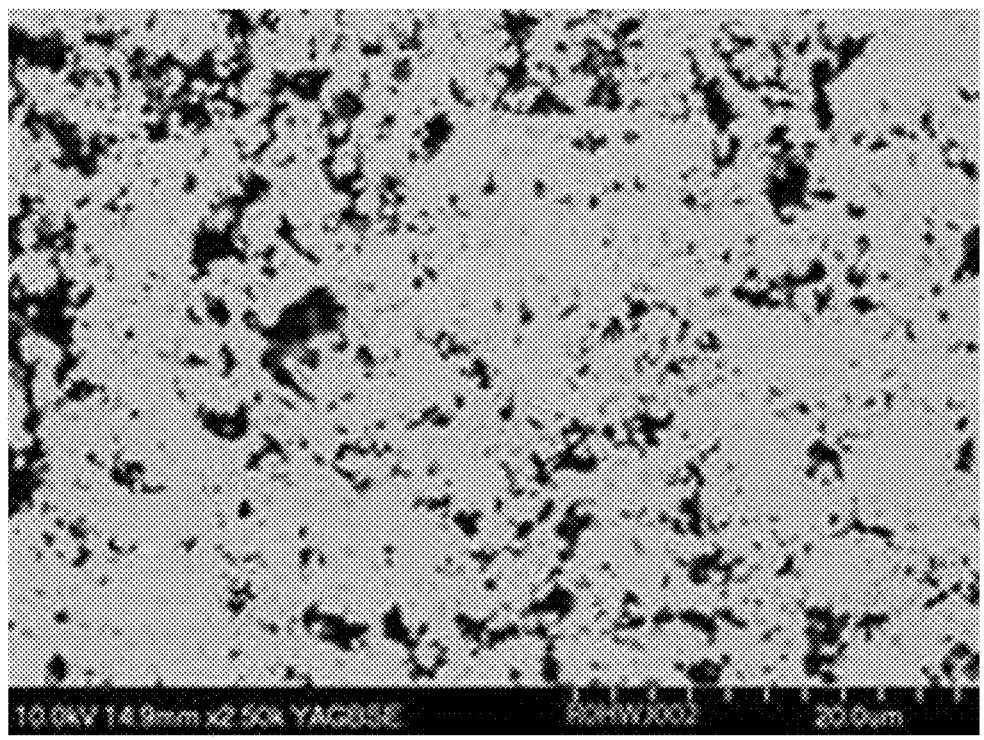
FIG. 7A is an enlarged view of a column in a primary coating layer of the FIG. 7 coated substrate.
Figure 8:
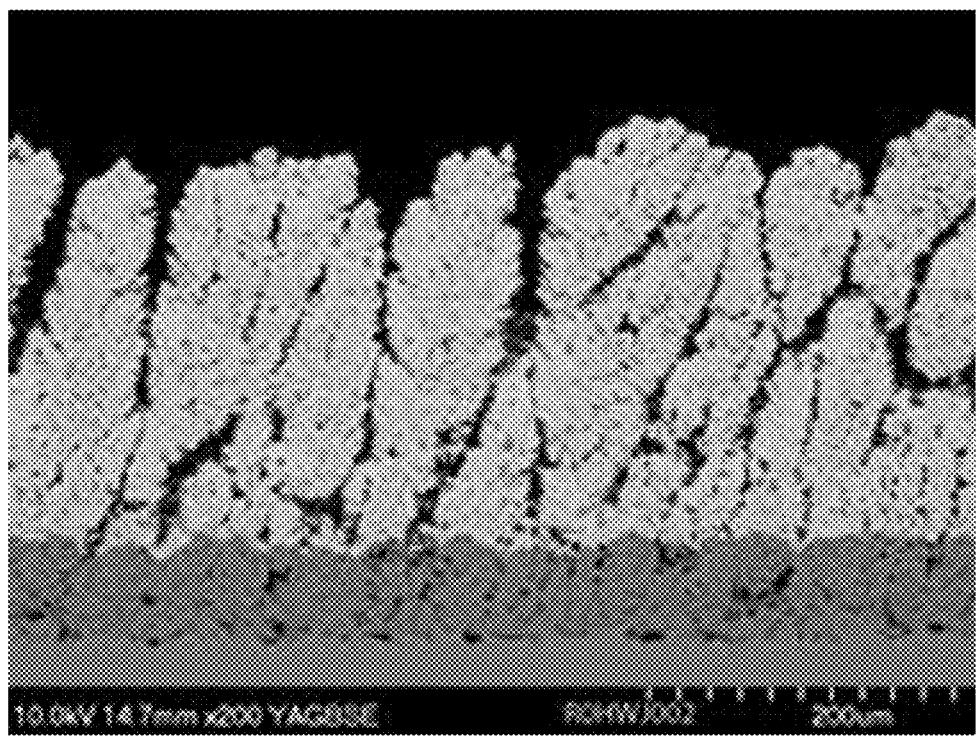
FIG. 8 is a sectional micrograph of a fourth example coated substrate.
Figure 8A:
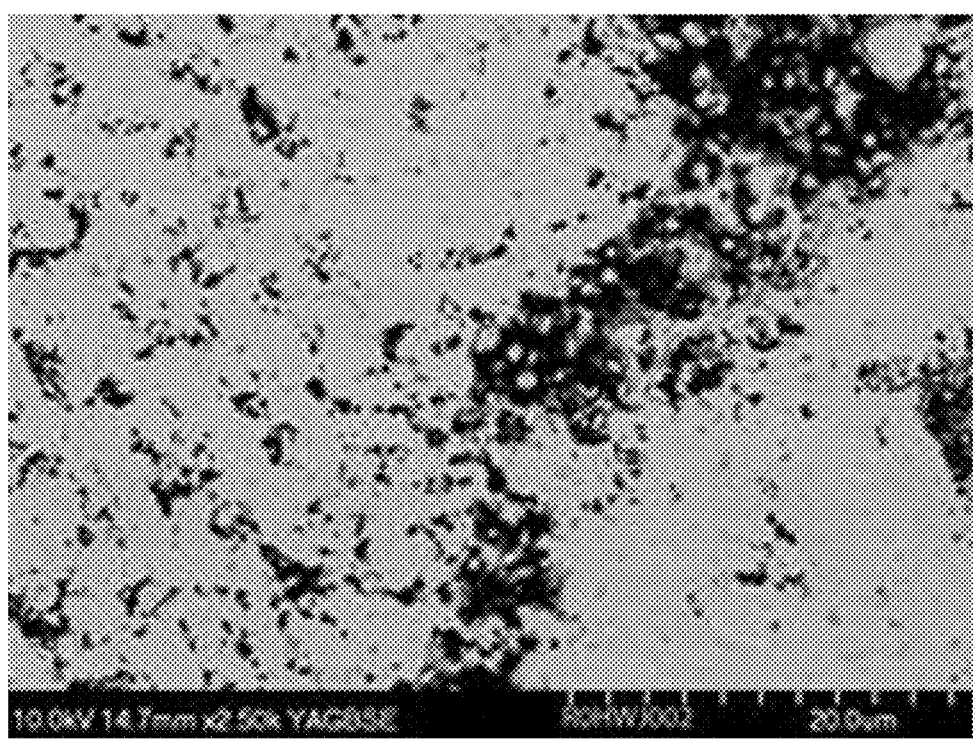
FIG. 8A is an enlarged view of a column in a primary coating layer of the FIG. 8 coated substrate.
Figure 9:
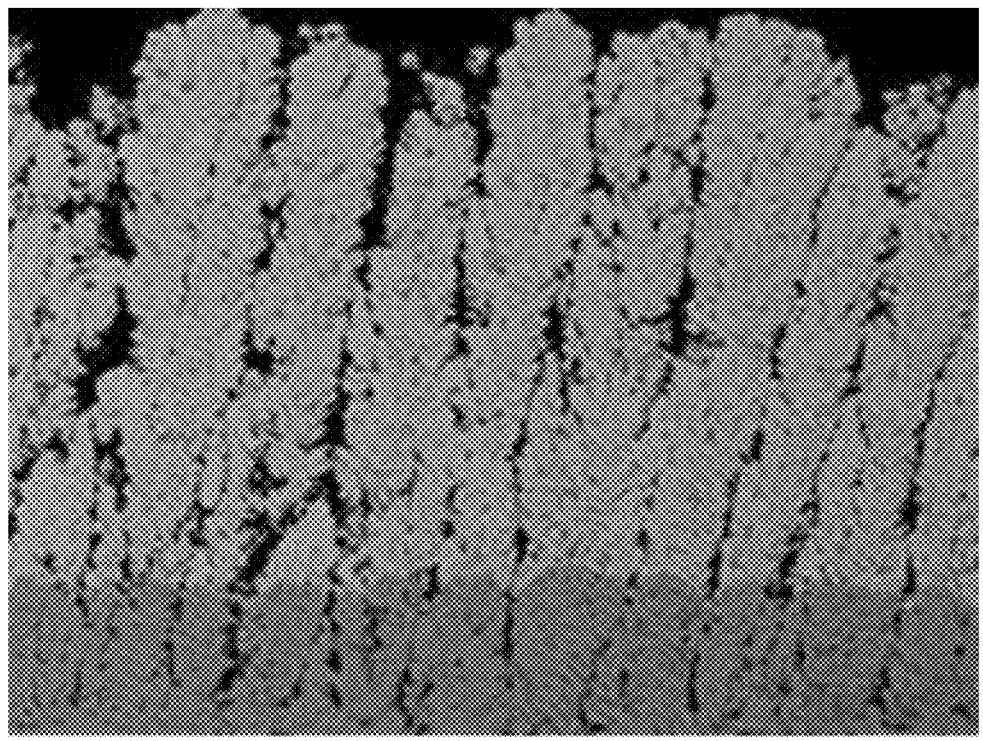
FIG. 9 is a sectional micrograph of a fifth example coated substrate.
Figure 9A:
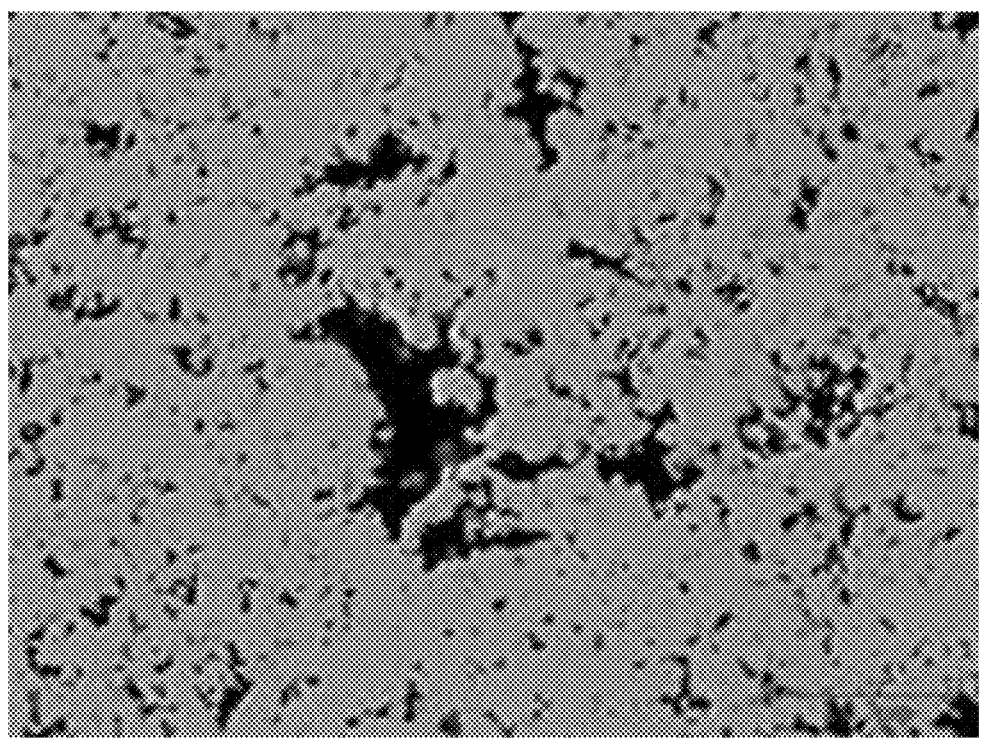
FIG. 9A is an enlarged view of a column in a primary coating layer of the FIG. 9 coated substrate.
Figure 18:
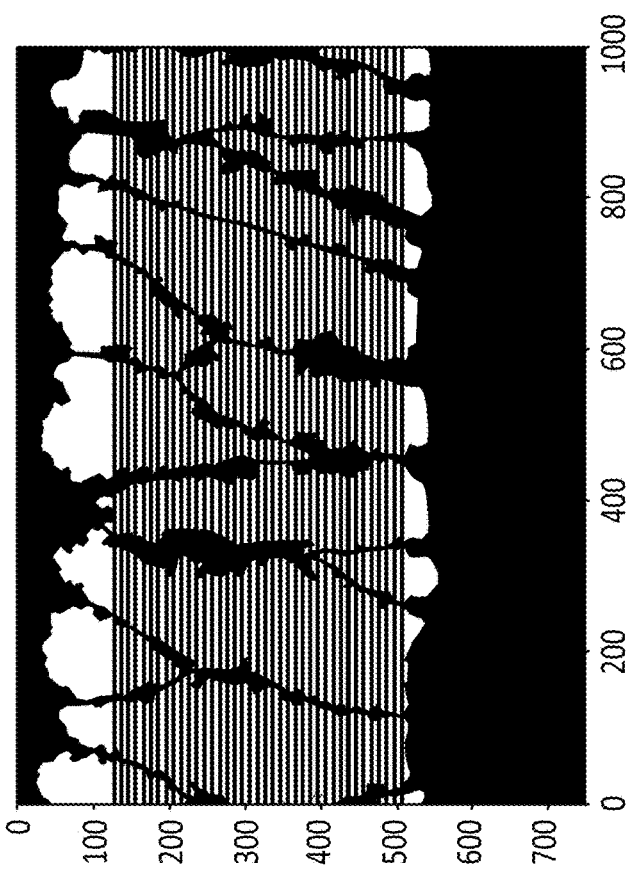
FIG. 18 is a black/white thresholded image of the FIG. 7 micrograph with an overlay of measurement lines.
Figure 21:
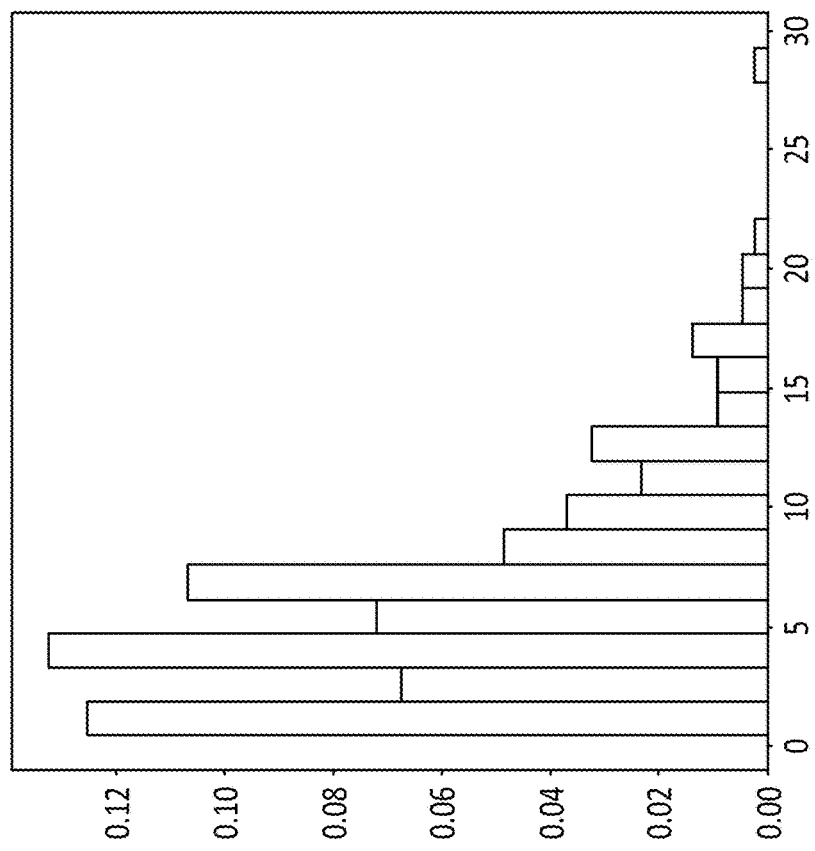
FIG. 21 is a histogram of the column gap widths measured at the FIG. 20 measurement lines.
Figure 20:
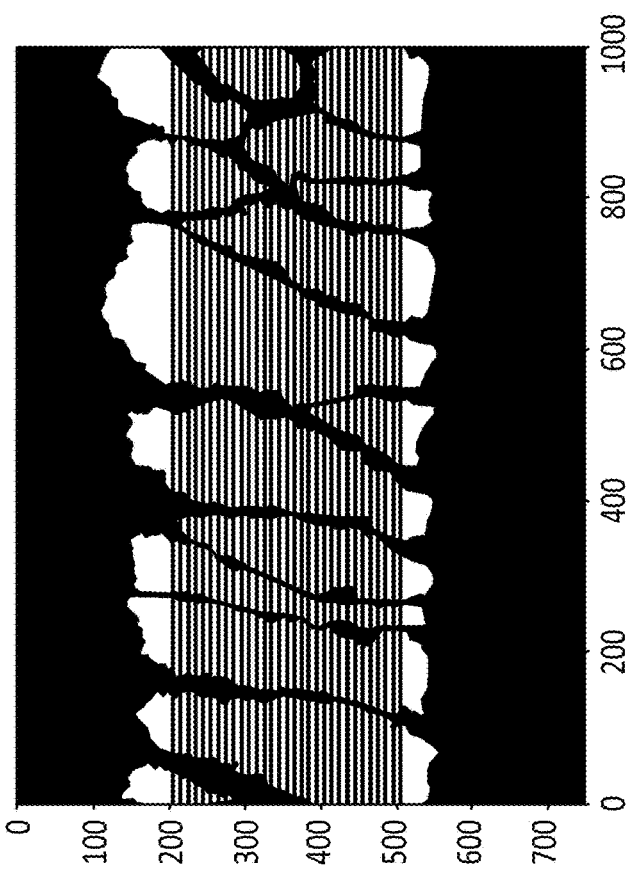
FIG. 20 is a black/white thresholded image of the FIG. 8 micrograph with an overlay of measurement lines.
Figure 23:
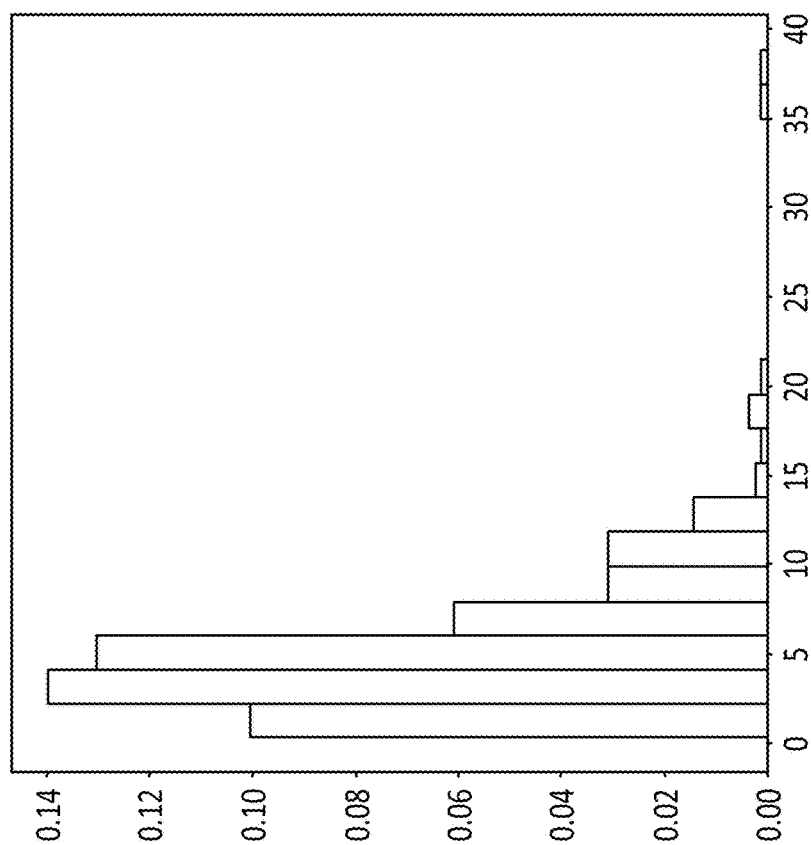
FIG. 23 is a histogram of the column gap widths measured at the FIG. 22 measurement lines.
Figure 22:
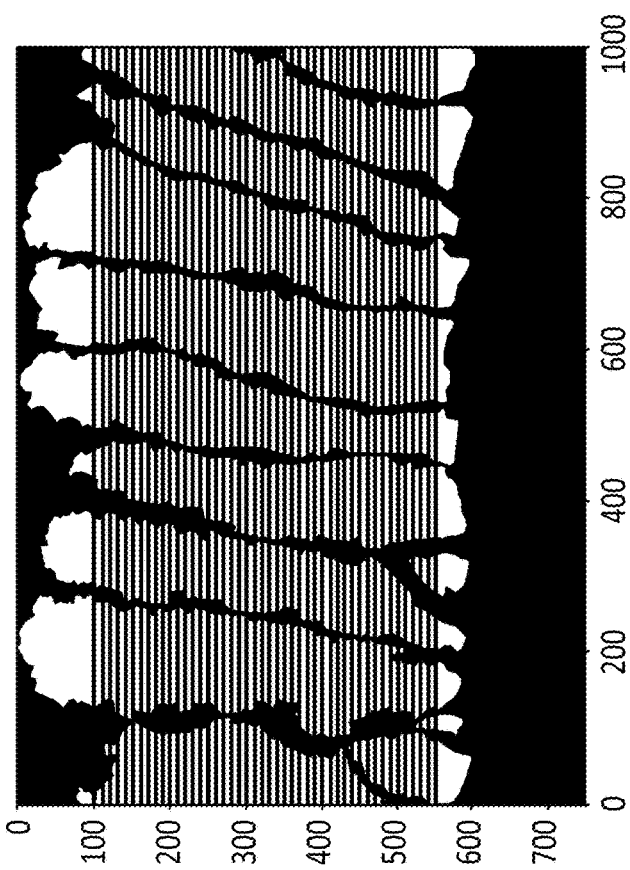
FIG. 22 is a black/white thresholded image of the FIG. 9 micrograph with an overlay of measurement lines.

FIGS. 7-9 discussed below reflect other parameter changes. FIGS. 18, 20, and 22 are respective corresponding thresholded images like FIG. 16 and FIGS. 19, 21, and 23 are respective corresponding histograms like FIG. 17. Table II provides the measured gap width:

TABLE II

| | Gap Width (micrometers) | | | | |
|---|---|---|---|---|---|
| FIG. | Mean | Min | 25% | 75% | Max |
| 4 (prior art) | 2.4 | 0.3 | 1.3 | 2.6 | 29.1 |
| 7 | 5.4 | 0.3 | 2.0 | 7.4 | 39.7 |
| 8 | 8.4 | 0.4 | 3.3 | 10.9 | 73.2 |
| 9 | 5.8 | 0.3 | 2.6 | 7.5 | 38.9 |

FIG. 7 shows reduced power, increased standoff, and reduced volumetric flow. In this example, the relative argon content is reduced. Intra-column porosity is increased relative to the baseline. In particular, total porosity increased to about 28% as measured by image analysis from micrographs at 250× magnification. The fraction of pores greater than 2 square micrometers increased to about 22% (of sectional area), while the pores less than 2 square micrometers decreased to 6.3%. Gaps and gap sizes are less defined because of the increase in the large pores (those greater than 2 square micrometers) at the periphery of the columns and because of associated increased bridging. Average gap size was measured to be 5.4 micrometers which is about 2 percent of layer thickness.

FIG. 8 shows the effect of increased particle velocity relative to the baseline. In this example, it is achieved by increasing the argon flow rate. The gap width is significantly increased. Total porosity is decreased to about 18% as measured by image analysis from micrographs at 250× magnification. The fraction of pores greater than 2 square micrometers (of sectional area) decreased to about 12%, while the pores less than 2 square micrometers decreased to 5.9%. Average gap size is increased to 8.4 micrometers.

FIG. 9 shows effects of decreasing feed rate while maintaining other parameters. Relative to the baseline, porosity is increased to about 26% as measured by image analysis from micrographs at 250× magnification. The pores greater than 2 square micrometers (of sectional area) increased to about 18%, while the pores less than 2 square micrometers increased to 8.3%. Relative to the baseline, column width is decreased, resulting in increased gap frequency. The gap size increased to 5.8 micrometers.

Figure 10:
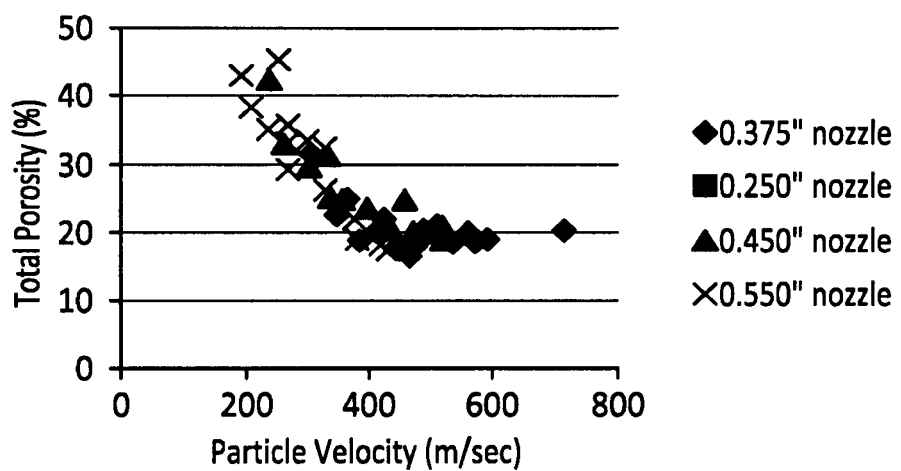
FIG. 10 is a plot of total porosity against particle velocity for four nozzle diameters.

FIG. 10 is a plot of total porosity versus particle velocity for four nozzle diameters. Particle velocity was varied from approximately 200 m/sec to greater than 600 m/sec as measured by a Tecnar Accuraspray g3c plume diagnostic sensor (Tecnar Automation Ltée, Saint-Bruno-de-Montarville, Quebec, Canada) at a standoff distance of 3.25 inches. Total porosity and pores greater than 2 square micrometers decrease as a function of particle velocity. Parameters varied to achieve the velocities were the total gas flow and the ratios of gases used.

Figure 11:
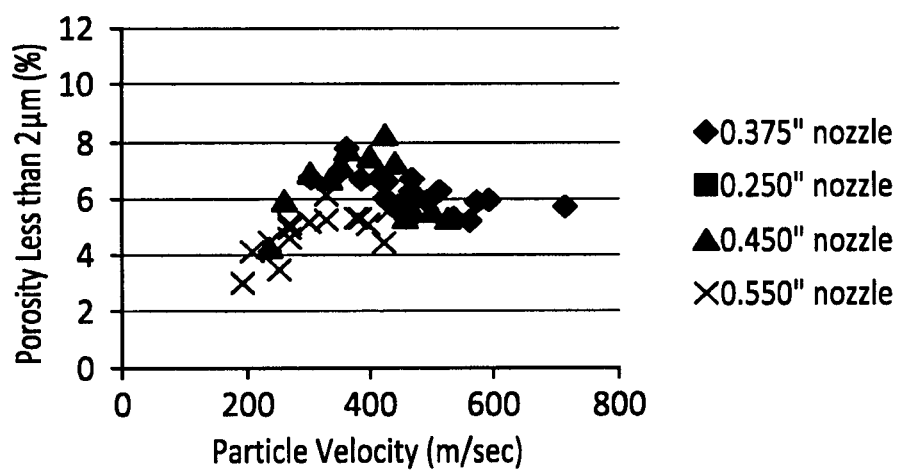
FIG. 11 is a plot of porosity less than two micrometers versus particle velocity for the FIG. 10 nozzles.
Figure 12:
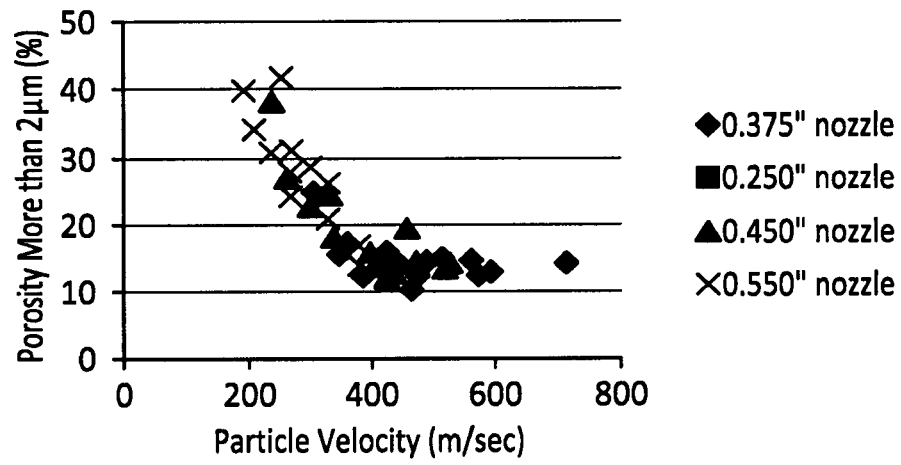
FIG. 12 is a plot of porosity more than two micrometers versus particle velocity for the FIG. 10 nozzles.

FIGS. 11 and 12 respectively break out the porosity less than two micrometers and porosity greater than two micrometers. The size is measured by image analysis from micrographs at 250× magnification.

From FIGS. 10-12, it is seen that the results collapse to a single trend of porosity as a function of particle velocity.

Thus, it is seen that spray parameters alone may be used to achieve a significant gap width increase. An exemplary range of mean width is 4.0 micrometers or greater or 5.0 micrometers or greater or 6.0 micrometers or greater. Upper ends on these ranges are 10.0 micrometers or 12.0 micrometers or 20.0 micrometers. This may be achieved on a smooth surface.

Figure 13:
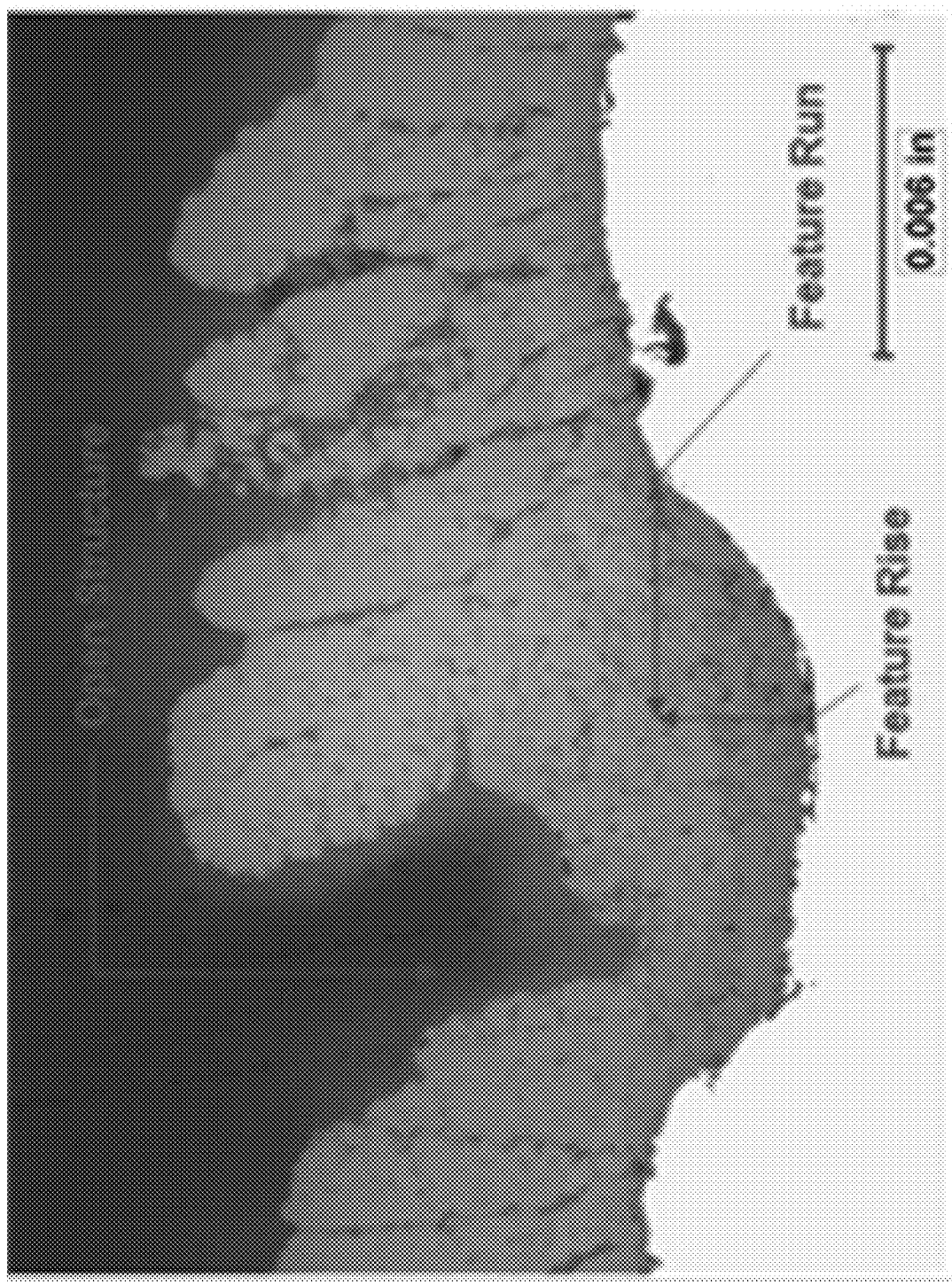
FIG. 13 is a sectional micrograph of an SPS-coated first roughened substrate.

As noted above, increasing surface roughness (discussed further below) increases the shadowing effects that create the separation of columns. FIG. 13 is a sectional view of an SPS 8YSZ-coated substrate (no bondcoat for test purposes) where the substrate had been roughened by coarse abrasive belt sanding of the substrate prior to application of the TBC. A groove feature is shown cut by the abrasive in the substrate.

Figure 14:
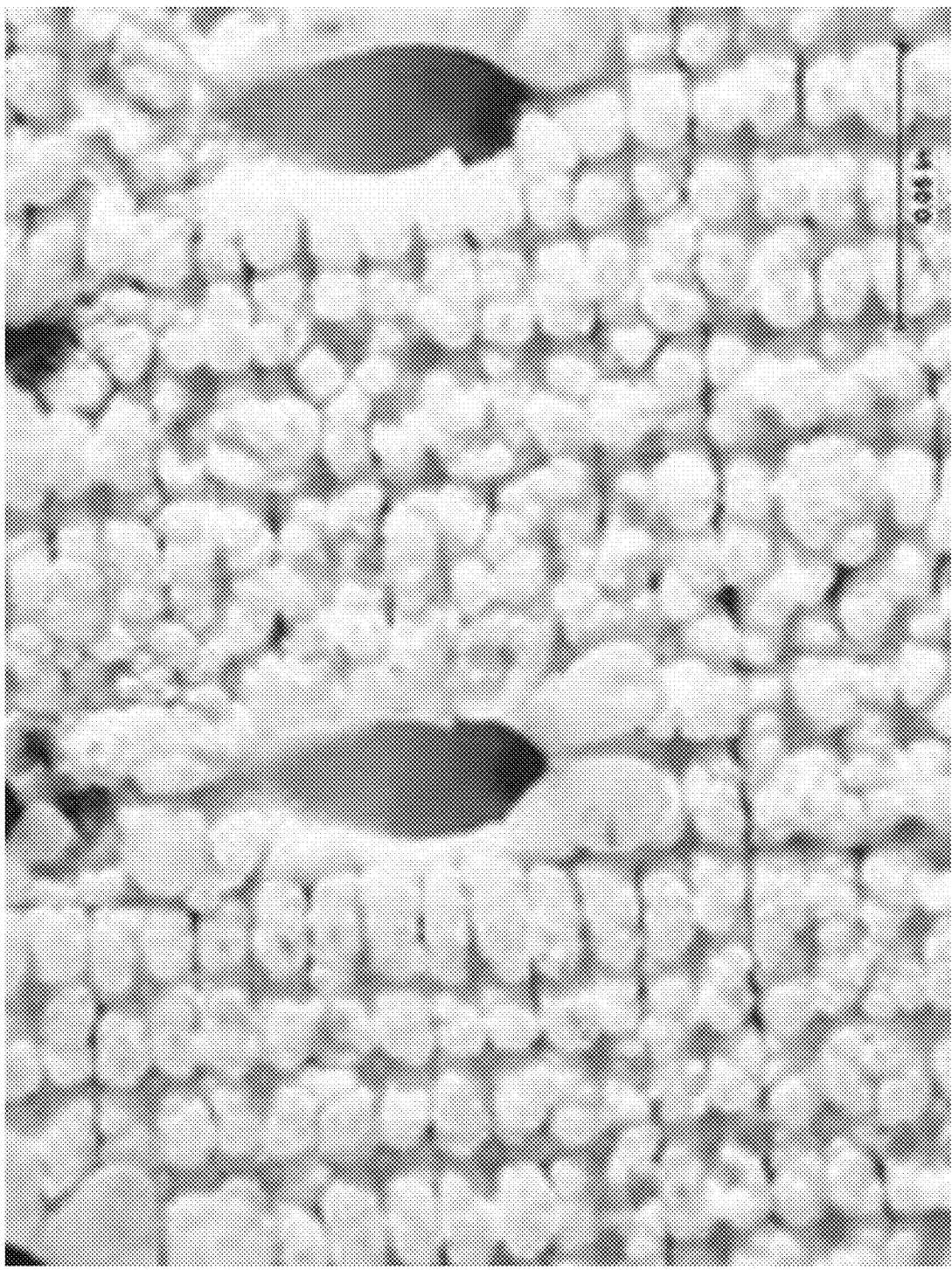
FIG. 14 is a surface view of an SPS-coated second roughened substrate.
Figure 15:
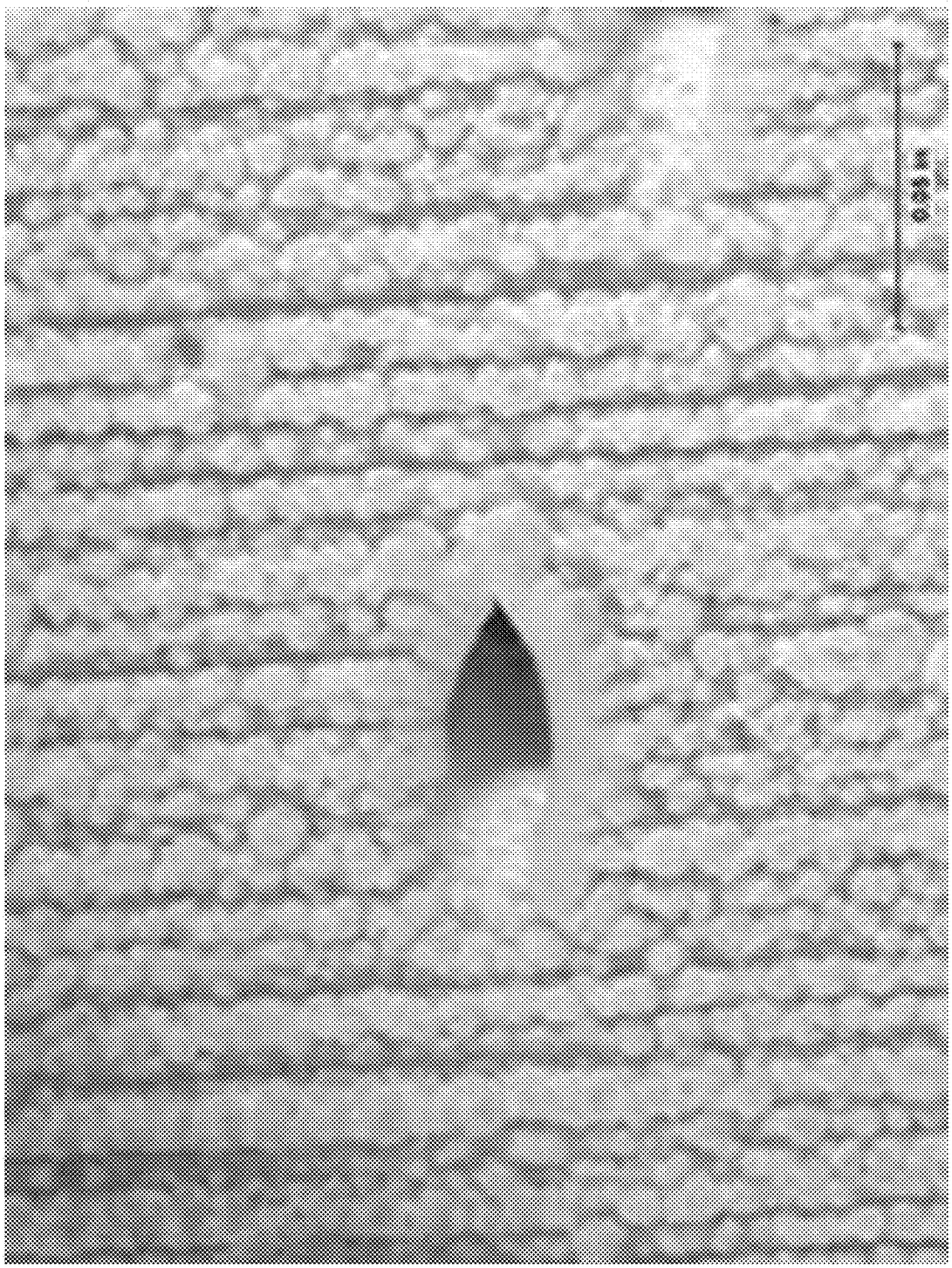
FIG. 15 is a surface view of an SPS-coated third roughened substrate.

FIG. 14 is a surface view of a similarly coated substrate where the substrate had been roughened by abrasive belting in two orthogonal directions. FIG. 15 is a surface view of a similarly coated substrate where the substrate had been roughened by abrasive belting in primarily one direction. The particular belting involved 36-mesh alumina grit on a sanding belt. Force and duration were not controlled. An exemplary grit range is at least as coarse/rough as 120-mesh or at least as coarse as 80-mesh, with opposite ends of grit ranges optionally being 24- or 20-mesh. When belting in two directions, exemplary directions are substantially transverse, preferably close to orthogonal (e.g., up to 20° or 10° off orthogonal).

The FIG. 14 view shows gap widths of somewhat >0.005 inches (>125 micrometers) in one direction and about 0.001 inches (25 micrometers) in the other direction effectively forming a rectangular array of columns.

FIG. 13 also shows an opening/recess between two columns (labeled "open structure") of approximately 0.004 inches (100 micrometers) in width above the broader/wider substrate groove feature. Such open structure gaps do not appear to extend all the way to the substrate or bondcoat but have bases at approximately even height with the feature peaks in the substrate or bondcoat. At the bases, the coating structure may be free of columns due to the shadowing from the coating that forms adjacent the groove feature and contain a higher level of porosity. The coating thickness within the groove feature may also be a fraction of the coating thickness between grooves. The exemplary groove has a width of about 0.01 inch (0.25 mm) and a depth of about 0.04 inch (1 mm). Thus, exemplary depth is about 20% to 50% of width. An exemplary depth range is about 0.20 mm to about 2.0 mm.

Thus, even without the modified spray parameters, roughening may achieve substantially greater local separations. Progressively finer grit (and associated roughness features on the substrate) may leave finer gaps. Thus, exemplary gap width achieved by such roughening may be up to about 150 micrometers. Exemplary target gap width from roughening may be at least 10 micrometers or at least 25.0 micrometers and upper limits may be 125 micrometers or 150 micrometers. Desirable upper limits may be influenced by compromise of basic function (e.g., thermal insulation for a TBC). This may make it desirable, depending on application, to keep gap width at no more than the overall ceramic coating thickness and/or mean column width. More narrowly, limits of 25% of the thickness or 25% of the column width may be used.

In terms of synergy between modified spray parameters and roughening, different combinations may be used. In one example, a partial roughening (a fraction of the groove width observed in FIG. 13—e.g., achieved via finer abrasive) to leave narrower open structure widths but where column gap widths are increased to at least 4.0 micrometers, preferably at least 8.0 micrometers, with upper limits as noted above. This allows use of reduced gas flow spray parameters (e.g., Range families 1 and 3 from Table I) to focus on increase intracolumn porosity. Another example involves such partial roughening combined with less severe spray parameters (e.g., Range families 2 and 4) to achieve such gap width. These kinds of dual factor effects are additive and are relevant to address complexities in applying coatings to complex shapes where the target roughening or the spray parameters may not be fully realized. Additionally, combination of dual factor approaches offer capability that can offset variation in the process in order to achieve gap and intracolumn porosity targets. So in essence more margin to achieve the target.

In further synergy situations, the same coating parameters may be used over a broader area of the substrate than the grooving. In general, The methods may be used over significant regions or portions of regions, typically at least 4.0 cm$^2$ or 9.0 cm$^2$. For example, on airfoil members, the methods may be used on portions of at least 10% of the area of one or both of the pressure side or suction side or platform or shroud gaspath surface.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline coating composition or process or baseline component, details of such baseline may influence details of particular implementations. Accordingly, other embodiments are within the scope of the following claims.

What is claimed is:

1. A coated substrate comprising:
   a substrate; and
   a coating system comprising:
      one or more ceramic layers,
   wherein:
      the substrate has grooves;
      the grooves have depth of 0.20 mm to 2.0 mm;
      at least a first layer of one of the one or more ceramic layers is a columnar layer having as-deposited columns and intercolumn gaps; and
      said intercolumn gaps have a mean width of at least one of:
         at least 4.0 micrometers; and
         at least 1.5% of a thickness of said first layer.

2. The coated substrate of claim 1 wherein:
   said intercolumn gaps have a mean width of at least 4.0 micrometers over an area of the substrate of at least 4.0 cm$^2$.

3. The coated substrate of claim 1 wherein:
   the substrate is a metallic substrate; and
   the coating system comprises:
      a bondcoat; and
      said one or more ceramic layers atop the bondcoat.

4. The coated substrate of claim 3 wherein one or more of:
   the metallic substrate is a nickel-based superalloy;
   the coated substrate is a gas turbine engine component;
   the bondcoat is an MCrAlY or an aluminide; and
   the first layer is a YSZ or a GSZ.

5. The coated substrate of claim 3 wherein:
   the metallic substrate is a nickel-based superalloy;
   the coated substrate is a gas turbine engine component;
   the bondcoat is an MCrAlY or an aluminide; and
   the columnar layer is a YSZ or a GSZ.

6. The coated substrate of claim 3 wherein:
   the metallic substrate is a nickel-based superalloy;
   the coated substrate is a gas turbine engine component;
   the bondcoat is an MCrAlY; and
   the columnar layer is:
      a YSZ layer; or
      a combination of a GSZ layer atop a YSZ layer.

7. The coated substrate of claim 1 wherein:
   the gaps are as-sprayed gaps.

8. The coated substrate of claim 1 wherein:
   the intercolumn gaps have mean depths of at least 100 micrometers; and
   the mean gap width is 4.0 micrometers to 25.0 micrometers.

9. The coated substrate of claim 1 being a gas turbine engine component and wherein:
   the columnar layer is along a gaspath-facing surface of the component.

10. The coated substrate of claim 1 wherein:
    the coating system has open structures formed by those of the gaps above the grooves.

11. The coated substrate of claim 10 wherein:
    the substrate has at least a first plurality of parallel grooves of said grooves inducing a first plurality of said open structures in the coating system.

12. The coated substrate of claim 11 wherein:
    the substrate has a second plurality of parallel grooves of said grooves up to 20° off orthogonal to the first plurality, the second plurality of grooves inducing a second plurality of said open structures in the coating system.

13. The coated substrate of claim 1 wherein:
    said intercolumn gap mean width is at least 6.0 micrometers.

14. A method for manufacturing the coated substrate of claim 1, the method comprising:
    applying the columnar layer by suspension plasma spray.

15. The method of claim 14 further comprising:
    applying a bondcoat to the substrate prior to the applying of the columnar layer.

16. The method of claim 14 further comprising:
    roughening the substrate or a bondcoat thereon prior to the applying of the columnar layer.

17. The method of claim 16 wherein:
    the roughening is an abrasive process.

18. The method of claim 17 wherein:
    the abrasive process comprises abrasive belting in two directions.

19. A method for using the coated substrate of claim 1, the method comprising:
    running the coated substrate in a gas turbine engine exposing the coated substrate to CMAS, wherein:
    the exposing causes CMAS to enter the gaps and laterally infiltrate into the columnar layer while leaving the gaps open adjacent the infiltration.

20. The method of claim 19 wherein:
    the CMAS bridges gap openings while leaving gap portions therebelow open.

* * * * *